United States Patent
Bakaraju et al.

(10) Patent No.: US 12,345,961 B2
(45) Date of Patent: Jul. 1, 2025

(54) FREEFORM CONTACT LENS SOLUTION FOR MYOPIA

(71) Applicant: NTHALMIC HOLDING PTY LTD, Sydney (AU)

(72) Inventors: Ravi Chandra Bakaraju, Sydney (AU); Klaus Ehrmann, Sydney (AU); Fabian Conrad, Sydney (AU)

(73) Assignees: Nthalmic Holding Pty Ltd, Sydney (AU); Brighten Optix Corp., Taipei (TW)

( * ) Notice: Subject to any disclaimer, the term of this patent is extended or adjusted under 35 U.S.C. 154(b) by 571 days.

(21) Appl. No.: 17/641,089

(22) PCT Filed: Sep. 23, 2020

(86) PCT No.: PCT/AU2020/051006
§ 371 (c)(1),
(2) Date: Mar. 7, 2022

(87) PCT Pub. No.: WO2021/056059
PCT Pub. Date: Apr. 1, 2021

(65) Prior Publication Data
US 2022/0326545 A1    Oct. 13, 2022

(30) Foreign Application Priority Data

Sep. 25, 2019 (AU) .................... 2019903582
Feb. 14, 2020 (AU) .................... 2020900414

(51) Int. Cl.
*G02C 7/04* (2006.01)
(52) U.S. Cl.
CPC ............ *G02C 7/042* (2013.01); *G02C 7/048* (2013.01); *G02C 2202/24* (2013.01)
(58) Field of Classification Search
CPC ..... G02C 7/042; G02C 7/048; G02C 2202/24
(Continued)

(56) References Cited

U.S. PATENT DOCUMENTS

2010/0110371 A1   5/2010   Ho et al.
2014/0347622 A1   11/2014  Wu
(Continued)

FOREIGN PATENT DOCUMENTS

EP    0982618 A1    3/2000
JP    2009524085 A   6/2009
(Continued)

OTHER PUBLICATIONS

Extended European search report in European application No. 20870236.5 mailed Sep. 25, 2023.
(Continued)

*Primary Examiner* — Wyatt A Stoffa
*Assistant Examiner* — Grant A Gagnon
(74) *Attorney, Agent, or Firm* — Cognition IP, P.C.; Edward Steakley

(57) ABSTRACT

The present disclosure generally relates to contact lenses for use with eyes experiencing eye-length related disorders, like myopia. This invention relates to contact lens for managing myopia wherein the contact lens comprises of an optical zone about an optical axis and a non-optical peripheral carrier zone about the optical zone; wherein the optical zone is configured with a substantially single vision power profile providing correction for the eye, and a decentred second region configured with an astigmatic, or toric, or asymmetric power distribution, the second region located substantially away from the optical centre and configured to provide at least in part a regional conoid or interval of Sturm producing an optical stop signal for the eye; and wherein the non-optical peripheral carrier zone is configured with a thickness profile that is substantially rotationally symmetric to further provide a temporally and spatially varying stop signals to reduce myopia progression.

20 Claims, 18 Drawing Sheets

(58) Field of Classification Search
USPC .......................................................... 351/159
See application file for complete search history.

(56) References Cited

U.S. PATENT DOCUMENTS

| | | |
|---|---|---|
| 2015/0219926 A1 | 8/2015 | Fujikado et al. |
| 2016/0377884 A1 | 12/2016 | Lau et al. |
| 2017/0090216 A1 | 3/2017 | Goto et al. |

FOREIGN PATENT DOCUMENTS

| | | |
|---|---|---|
| JP | 2017010031 A | 1/2017 |
| WO | 2007082268 A3 | 9/2007 |

OTHER PUBLICATIONS

International Search Report in PCT International Application No. PCT/AU2020/051006, mailed Nov. 27, 2020.

FREEFORM CONTACT LENS SOLUTION FOR MYOPIA

CROSS-REFERENCE

This application is a 35 U.S.C. § 371 national stage application of PCT International Application No. PCT/AU2020/051006, filed on Sep. 23, 2020, which claims priority to Australian Provisional Application Serial No. 2019/903582 filed on Sep. 25, 2019, entitled "Rotationally asymmetric lens for myopia" and Australian Provisional Application Serial No. 2020/900414 filed on Feb. 14, 2020, entitled "A freeform lens design", both all of which are herein incorporated by reference in their entirety.

FIELD OF THE INVENTION

The present disclosure generally relates to contact lenses for use with eyes experiencing eye-length related disorders, like myopia. This invention relates to a contact lens for managing myopia wherein the contact lens comprises of an optical zone about an optical axis; and a non-optical peripheral carrier zone about the optical zone; wherein the optical zone is configured with a substantially single vision power profile providing a substantial correction for the eye, and a decentred second region configured with an astigmatic, or toric, or asymmetric power distribution, the second region located substantially away from the optical centre and configured to provide at least in part directional cues in form of a regional conoid or interval of Sturm producing an optical stop signal on the retina; and wherein the non-optical peripheral carrier zone configured with a thickness profile that is substantially rotationally symmetric to further provide temporally and spatially varying stop signals to decelerate, ameliorate, control, inhibit, or reduce the rate of myopia progression over time.

BACKGROUND

Human eyes are hyperopic at birth, where the length of the eyeball is too short for the total optical power of the eye. As the person ages from childhood to adulthood, the eyeball continues to grow until the eye's refractive state stabilises. The growth of the eye is understood to be controlled by a feedback mechanism and regulated predominantly by the visual experience, to match the eye's optics with the eye length and maintain homeostasis. This process is referred to as emmetropisation.

The signals that guide the emmetropisation process are initiated by the modulation of light energy received at the retina. The retinal image characteristics are monitored by a biological process that modulates the signal to start or stop, accelerate, or slow eye growth. This process coordinates between the optics and the eyeball length to achieve or maintain emmetropia. Derailing from this emmetropisation process results in refractive disorders like myopia.

The rate of incidence of myopia is increasing at alarming rates in many regions of the world, particularly in the East Asia region. In myopic individuals, the axial length of the eye is mismatched to the overall power of the eye, leading to distant objects being focused in front of the retina.

A simple pair of negative single vision lenses can correct myopia. While such devices can optically correct the refractive error associated with eye-length, they do not address the underlying cause of the excessive eye growth in myopia progression.

Excessive eye-length in high degrees of myopia is associated with significant vision-threatening conditions like cataract, glaucoma, myopic maculopathy, and retinal detachment. Thus, there remains a need for specific optical devices for such individuals, that not only correct the underlying refractive error but also prevent excessive eye lengthening or progression of myopia substantially consistent over time.

To date, numerous contact lens optical designs have been proposed to control the rate of eye growth, i.e. myopia progression. The following prior art is incorporated by reference. Collins et al in the U.S. Pat. No. 6,045,578 proposed the addition of positive spherical aberration at the foveal plane to provide a stimulus to control the rate of myopia progression. Aller in the U.S. Pat. No. 6,752,499 proposed the use of bifocal contact lenses for myopic participants who exhibit near-point esophoria. Smith et al in the U.S. Pat. No. 7,025,460 proposed the use of lenses that shift the peripheral image shell in front of the peripheral retina.

To et al in the U.S. Pat. No. 7,506,983 proposed a method of producing a secondary myopic image by use of Fresnel optics. Legerton in the U.S. Pat. No. 7,401,922 proposes another method using positive spherical aberration.

Phillips in the U.S. Pat. No. 7,997,725 proposes a method of simultaneous vision, wherein one part of the lens corrects for pre-existing myopia, while another part produces simultaneous myopic defocus signal. Thorn et al in the U.S. Pat. No. 7,803,153 proposes correction of all optical aberrations, including higher-order aberrations to reduce the rate of myopia progression.

Menezes in the U.S. Pat. No. 8,690,319 proposes the use of a constant distance vision power zone in the centre of the optic zone surrounded by a zone that provides positive longitudinal spherical aberration. Holden et al in the U.S. Pat. No. 8,931,897 proposes a method for treating a myopic eye with an inner optic zone and an outer optic zone with additional power to the baseline prescription power. Tse et al in the U.S. Pat. No. 8,950,860, proposes a method for retarding the progression of myopia with a concentric annular multi-zone refractive lens. Bakaraju et al in the U.S. Pat. No. 9,535,263 proposes a lens with multiple modes of higher-order spherical aberrations to control myopia progression.

In summary, contact lens design options for retarding the rate of myopia progression, include simultaneous defocus regions on the lens, lenses with positive spherical aberration, which may also be referred to as peripheral plus lenses, lenses with additional modifications to include both central and peripheral plus regions, lenses that comprise a specific set of higher-order aberrations.

Definitions

Terms, as used herein, are generally used by a person skilled in the art, unless otherwise defined in the following:

The term "myopic eye" means an eye that is either already experiencing myopia, is in the stage of pre-myopia, is at risk of becoming myopic, is diagnosed to have a refractive condition that is progressing towards myopia and has astigmatism of less than 1 DC. The term "progressing myopic eye" means an eye with established myopia that is diagnosed to be progressing, as gauged by either the change in refractive error of at least −0.25 D/year or the change in axial length of at least 0.1 mm/year.

The term "an eye at risk of becoming myopic" means an eye, which could be emmetropic or low hyperopic at the time but has been identified to have a high risk of becoming myopic based on genetic factors (e.g. both parents are myopic) and/or age (e.g. being low hyperopic at a young age) and/or environmental factors (e.g. time spent outdoors) and/or behavioural factors (e.g. time spent performing near tasks).

The term "optical stop signal" or "stop signal" means an optical signal or directional cue that may facilitate slowing, reversing, arresting, retarding, inhibiting, or controlling the growth of an eye and/or refractive condition of the eye.

The term "spatially varying optical stop signal" means an optical signal or to directional cue, provided at the retina, which changes spatially across the retina of the eye.

The term "temporally varying optical stop signal" means an optical signal or directional cue, provided at the retina, which changes with time.

The term "spatially and temporally varying optical stop signal" means an optical signal or directional cue, provided at the retina, which changes with time and spatially across the retina of the eye.

The term "contact lens" means a finished contact lens to be fit on the cornea of a wearer to affect the optical performance of the eye, usually packaged in a vial, blister pack or similar.

The term "optical zone" or "optic zone" means the region on the contact lens which has the prescribed optical effect which includes correction of the refractive error as well as a second region which provides the optical stimulus to slow the rate of myopia progression. The optical zone may be further distinguished by front and back optic zone. The front and back optic zone mean anterior and posterior surface areas of a contact lens which contribute to the prescribed optical effect, respectively. An optical zone of the contact lens may be circular or elliptical or of another irregular shape. The optic zones of contact lenses with only sphere powers are generally circular in shape. However, the introduction of toricity may lead to an elliptical optical zone in certain embodiments.

The term "optical centre" or "optic centre" means the geometric centre of the optical zone of the contact lens. The terms geometrical and geometric are essentially the same.

The term "optical axis" means the line passing through the optical centre and substantially perpendicular to the plane containing the edge of the contact lens.

The term "blend zone" is the zone that connects or lies between the optical zone and the peripheral carrier zone of the contact lens. The term "blending zone" is synonymous with "blend zone" in certain embodiments and may be on the front or the back surface or both surfaces of the contact lens. The blend zone may be polished, smoothed junction(s) between the two different adjacent surface curvatures. The thickness of the blending zone may also be referred to as junction thickness.

The term "through-focus" means a region that is substantially anterior-posterior to the retina. In other words, a region approximately just in front of the retina and/or approximately just behind the retina.

The term "carrier zone" is a non-optical zone that connects or lies between the blend zone and the edge of the contact lens.

The term "peripheral zone" or "peripheral carrier zone" is synonymous with "carrier zone" with no prescribed optic effect.

The term or phrase "spherical optical zone" may mean that the optical zone has a uniform power distribution without substantial amounts of primary spherical aberration.

The term or phrase "non-spherical optical zone" may mean that the optical zone does not have a uniform optical power distribution. The non-spherical optical zone may be further classified into lower-order aberrations like astigmatism or toricity in certain embodiments. The terms or phrases "astigmatic optical zone" or "toric optical zone" may mean that the optical zone has a sphero-cylindrical power distribution.

The term "ballast" means the rotationally asymmetrical distribution of thickness profile within the carrier zone to affect the rotational orientation of a contact lens when placed on an eye.

The term "prism ballast" means a vertical prism used to create a wedge design that will help stabilise the rotation and orientation of a toric contact lens on the eye.

The term "slab-off" means purposeful thinning of the contact lens towards the edge of the inferior and superior periphery of the contact lens in one or more discrete areas to achieve desired contact lens rotational stabilisation.

The term "truncation" refers to an inferior edge of a contact lens that is designed with a nearly straight line for control over rotational stabilisation of a contact lens.

The terms "negative", "plano" or "positive" carrier means the contact lens having an edge thickness, as measured approximately 0.1 mm distance from the lens diameter, that is greater than the junction thickness, edge thickness equal to the junction thickness and edge thickness less than the junction thickness, respectively.

The term "model eye" may mean a schematic, raytracing, or a physical model eye.

The terms "Diopter", "Dioptre" or "D" as used herein is the unit measure of dioptric power, defined as the reciprocal of the focal distance of a lens or an optical system, in meters, along an optical axis. Usually, the letter "D" signifies spherical dioptric power, and the letter "DC" signifies cylindrical dioptric power.

The term "back vertex power" means the reciprocal of back vertex focal length over the optical zone, expressed in Dioptres (D). The terms "SPH" or "Spherical" power means substantially uniform power between all meridians of the optic zone.

The terms "second region" or "second region within the optic zone" means another distinct region within the optic zone of the contact lens with a desired or prescribed optical effect that is substantially decentred from the optical centre or the optical axis.

The terms "base prescription" or "base prescription for correcting the refractive error" means the standard contact lens prescription required to correct underlying myopia in an individual, with or without astigmatism.

The terms "regional conoid of Sturm" or "regional interval of Sturm" means the resultant off-axis regional through-focus image profile formed on or about the retina, due to astigmatism, toricity, or asymmetric power profile, configured within the second region of the optic zone, represented with the regional elliptical blur patterns including the regional sagittal and tangential planes, and a circle of least confusion.

The term "power profile" means the one-dimensional power distribution of localised optical power across the optic zone, either as a function of radial distance at a given azimuthal angle with the optical centre as a reference; or as a function of an azimuthal angle measured at a given radial distance.

The term "power map" means the two-dimensional power distribution across the optical zone diameter in cartesian or polar coordinates.

The term "radial" in context of describing the entire optic zone means in the direction radiating out from the optical centre of the contact lens, defined along an azimuthal angle. The term "azimuthal" in the context of describing the entire optic zone means in the direction circumferential about the optical centre of the optic zone defined at a radial distance.

The term "power profile of the second region" means the distribution of localised optical power as a function of a radial distance and an azimuthal angle measured from the geometrical centre of the second region as a reference. The power profile of the second region may be configured over a circular or elliptical region.

The term "power map of the second region" means the two-dimensional power distribution across of the second region within the optical zone in Cartesian or polar coordinates, which may be circular or elliptical in shape.

The term "radial" in context of describing the second region means in the direction radiating out from the geometric centre of the second region, defined along an azimuthal angle.

The term "azimuthal" in the context of describing the second region means in the direction circumferential along the geometric centre of the second region of the optic zone defined at a radial distance.

The term "astigmatic or toric second region" means a power profile distribution with at least two principle power meridians defined over the second region, wherein the two principle power meridians are configured differently from the base prescription of the optical zone, and the difference between the two principle power meridians determines the magnitude of astigmatism or toric power of the second region.

The term "asymmetric second region" means variation of the localised power along the azimuthal direction about the geometric centre of the second region, while maintaining mirror symmetry along an arbitrarily chosen meridian within the second region.

The term "specific fit" means that the non-optical peripheral carrier zone is configured with a thickness profile that is substantially rotationally symmetric about the optical centre to facilitate substantially free rotation of the contact lens over time.

The specific fit referred in this invention means that the non-optical peripheral carrier zone is configured with a thickness profile that is substantially free of ballast, or prism, or any truncation.

The term "sub-foveal region" means the region immediately adjacent to the foveal pit of the retina of a wearer. The term "parafoveal region" means the region immediately adjacent to the foveal region of the retina of a wearer. The term "sub-macular region" means the region within the macular region of the retina of a wearer. The term "paramacular region" means the region immediately adjacent to the macular region of the retina of a wearer.

SUMMARY

Certain disclosed embodiments include contact lenses for altering the wavefront properties of incoming light entering a human eye. Certain disclosed embodiments are directed to the configuration of contact lenses for correcting, managing, and treating refractive errors.

One embodiment of the proposed invention is aimed to both correct the myopic refractive error and simultaneously provide an optical signal that discourages further eye growth or progression of myopia.

The proposed optical device provides a substantially continuously changing regional conoid of Sturm (i.e. optical stop signal) imposed on the peripheral retinal region. This disclosure includes a contact lens comprising a decentred, astigmatic or toric, second region within the optic zone, purposefully configured without a stabilised carrier zone to offer a substantially continuously changing (or temporally and spatially varying) myopic blur signal on the peripheral retina.

One other proposed contact lens embodiment comprises a substantially single vision optic zone with a second region within the optic zone configured with an astigmatic or toric power profile; wherein the single vision portion of the optic zone is used for correcting the myopic refractive error; and wherein the second region provides a regional conoid of Sturm (i.e. optical stop signal) in the peripheral retina that inhibits further eye growth or decelerates the rate of growth.

The power map of the said second region is configured rotationally asymmetric around its geometric centre. Another feature of the proposed embodiment may include a blending between the rotationally asymmetric second region and the remainder of the optic zone which may be circular or elliptical in shape.

Certain embodiments configured with a decentred astigmatic, toric, or rotationally asymmetric second region within an otherwise single vision optic zone configured on a rotationally symmetric peripheral non-optical carrier zone may overcome the limitations of the prior art by providing a temporally and spatially varying stop signal. Thus, allowing for minimisation of saturation of treatment effect on myopia progression.

In another embodiment, the present invention is directed to a contact lens for at least one of slowing, retarding, or preventing myopia progression. Another embodiment of the present disclosure is a contact lens comprising a front surface, a back surface, an optic zone, an optical centre, the optical zone including base prescription about the optical centre, a decentred second region with an astigmatic or toric power profile that is rotationally asymmetric about its geometric centre, and a non-optical peripheral carrier zone configured symmetrically about the optical zone; wherein the substantial portion of the optical zone is configured at least in part to provide adequate foveal correction; and the second region is configured to provide a regional conoid or interval of Sturm as a directional cue to reduce the rate of myopia progression; and the non-optical peripheral carrier zone is configured to provide a temporally and spatially variant optical stop signal; such that the treatment efficacy to reduce the progression of eye growth remains substantially consistent over time.

Another embodiment of the present disclosure is a contact lens for an eye, the contact lens including an optical zone with an optical centre, a decentred second region with a geometrical centre within the optical zone, and a non-optical peripheral carrier zone about the optical zone, wherein the substantial portion of the optical zone is configured with substantially base prescription providing substantial foveal correction for the eye, and the decentred second region configured with an asymmetric power distribution, located substantially away from the optical centre, providing at least in part directional cues in the form of a regional conoid of Sturm (i.e. optical stop signal) on the peripheral retina of the eye, and wherein the non-optical peripheral carrier zone is configured substantially without a ballast, or otherwise configured to allow rotation of the contact lens when on the eye, to provide a substantial temporal and spatial variation to the directional cues (i.e. optical stop signal).

In accordance with one of the embodiments, the present disclosure is directed to a contact lens for a myopic eye. The contact lens comprising a front surface, a back surface, an optic axis, an optical zone about the optical axis, the optic zone including a base prescription about the optic axis and a second region with an asymmetric power profile defined about its geometrical centre, the base prescription configured to correct the refractive error of the eye, and the second region configured to provide directional cues with a regional conoid of Sturm in the peripheral retina; wherein the said contact lens is further configured with a rotationally symmetric peripheral carrier zone to provide a temporally and spatially variant optical stop signal; such that the treatment efficacy to reduce the progression of eye growth remains substantially consistent over time. The present disclosure is directed towards modifying the incoming light through contact lenses that utilise a stop signal to decelerate the rate of myopia progression. The current disclosure is directed towards a contact lens device configured with a decentred second region within the optical zone, comprising an astigmatic, or toric, or asymmetric, power profile defined about the geometric centre of the second region, to impose an optical stop signal at the retina of the eye. Further, the imposed optical stop signal at the retina of the eye is configured to be a temporally (time) and spatially (location) variant. More specifically, this invention disclosure relates to a contact lens that is purposefully configured without any stabilisation in the non-optical peripheral carrier zone that may facilitate a temporally and spatially varying optical stop signal for inhibiting, reducing, or controlling progressive myopic refractive error.

Certain embodiments of the disclosure are directed towards a contact lens for a myopic eye, the contact lens including an optical zone around an optical centre and a non-optical peripheral carrier zone about the optical zone, wherein the optical zone is configured with substantially single vision power providing substantial correction for the eye, and a second region with an asymmetric power distribution about its geometric centre, the second region configured substantially away from the optical centre, providing at least in part a regional conoid of Sturm producing an optical stop signal for the eye, and wherein the non-optical peripheral carrier zone is configured substantially without a ballast, or otherwise configured to allow rotation of the lens when on the eye, to provide a substantial temporal and spatial variation to the optical stop signal.

The embodiments presented in this disclosure are directed to the ongoing need for enhanced optical designs and contact lenses that may inhibit the progression of myopia while providing reasonable and adequate vision performance to the wearer for a range of activities that the wearer may undertake as a daily routine. Various aspects of the embodiments of the present invention disclosure address such needs of a wearer.

DETAILED DESCRIPTION

Figure 1:
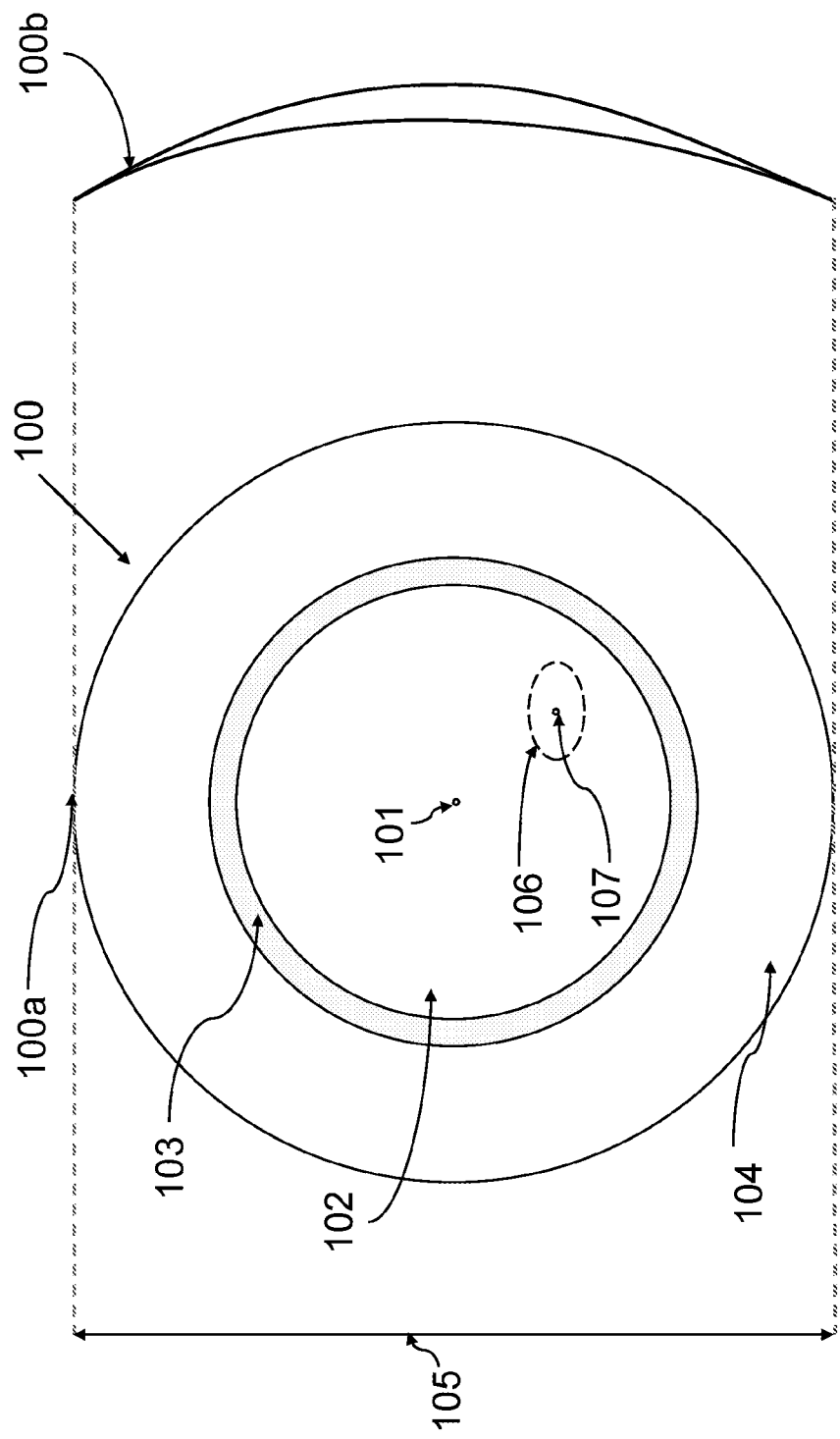
FIG. 1 illustrates the frontal view and a cross-sectional view of a contact lens embodiment. The frontal view further illustrates the optic centre, optic zone, second region within the optic zone, the geometric centre of the second region, a blend zone, and a carrier zone, according to certain embodiments.

Recent designs added to the prior art have some degree of relative positive power related to the prescription power of the lens, usually distributed rotationally symmetric around the optical axis of the contact lens.

Each of these options has its own strengths and weaknesses with respect to retarding the rate of myopia progression in an individual.

Some of the weaknesses are described herein. For example, some problems with the existing optical designs that are based on simultaneous images are that they compromise the quality of the vision at various other distances by introducing significant visual disturbances. This side effect is primarily attributed to significant levels of simultaneous defocus, use of significant amounts of spherical aberration, or significant change in power within the optic zone.

Given the influence of compliance of contact lens wear on the efficacy of such lenses, significant reduction of visual performance may promote poor compliance thus resulting in poorer efficacy. Accordingly, what is needed are optical designs for the correction of myopia and retardation of progression, without causing at least one or more of the shortcomings discussed herein. Other solutions will become apparent as discussed herein.

The efficacy rates of most of the contact lens designs in the prior art are established through randomised control clinical trials. The duration of these clinical trials using the prior art lenses range between 6 months and 3 years and the reported efficacy with the prior art contact lenses range between 25% and 75% when compared to the single vision control lenses.

A simple linear model of emmetropisation suggests that the magnitude of a stop-signal accumulates over time. In other words, the accumulated stop-signal depends on the total magnitude of exposure and not its temporal distribution. However, the inventors have observed from reports of clinical trials of various optical designs that a disproportionally larger percentage of the achieved efficacy or the slowing effect on the rate of progression occurs in the first 6 to 12-months.

After the initial burst of treatment, the efficacy is observed to wane over time. So, in light of the clinical observations, a more faithful model of emmetropisation to line up with the clinical results suggests that there may be a delay before the stop-signal builds, then saturation occurs with time, and perhaps a decay in the effectiveness of the stop-signal.

There is a need in the art for a contact lens that minimises this saturation of the treatment effect by providing a temporally and spatially varying stop-signal to retard the rate of eye growth, for example, myopia progression, without the need of burdening the wearer to switch between contact lenses of differing optical designs during a given period.

Accordingly, there exists a need for optical designs with a mechanism to achieve substantially greater, and/or substantially consistent, efficacy over time in reducing and/or slowing myopia progression without significantly compromising visual performance. In one or more examples, the substantially consistent efficacy overtime may be considered to be at least 6, 12, 18, 24, 36, 48 or 60 months.

In this section, the present disclosure will be described in detail with reference to one or more embodiments, some are illustrated and supported by accompanying figures. The examples and embodiments are provided by way of explanation and are not to be construed as limiting to the scope of the disclosure.

The following description is provided in relation to several embodiments that may share common characteristics and features of the disclosure. It is to be understood that one or more features of one embodiment may be combined with one or more features of any other embodiments which may constitute additional embodiments.

The functional and structural information disclosed herein is not to be interpreted as limiting in any way and should be construed merely as a representative basis for teaching a person skilled in the art to employ the disclosed embodiments and variations of those embodiments in various ways.

The sub-titles and relevant subject headings used in the detailed description section have been included only for the ease of reference of the reader and in no way should be used to limit the subject matter found throughout the invention or the claims of the disclosure. The sub-titles and relevant subject headings should not be used in construing the scope of the claims or the claim limitations.

Risk of developing myopia or progressive myopia may be based on one or more of the following factors: genetics, ethnicity, lifestyle, environmental, excessive near work, etc. Certain embodiments of the present disclosure are directed towards a person at risk of developing myopia or progressive myopia.

One or more of the following advantages are found in one or more of the disclosed optical devices, and/or methods of contact lens designs. A contact lens device or method providing a stop signal to retard the rate of eye growth or stop the eye growth or the state of refractive error of the wearer's eye based on a decentred second region within the optic zone configured with astigmatic, toric, or asymmetric, power profile. Certain embodiments include a contact lens device or method providing a temporally and spatially varying stop signal for increasing the effectivity of managing progressive myopia. A contact lens device or method that is not solely based on either rotationally symmetric positive spherical aberrations or simultaneous defocus primarily configured along the optical axis or optical centre, which suffers from the potential of significant visual performance degradation for the wearer.

The following exemplary embodiment is directed to methods of modifying the incoming light through a contact lens system that offers an optical stop signal at the retinal plane of the corrected eye. This may be achieved by using a decentred second region within the optical zone that is configured with a power profile defined rotationally asymmetrically about the geometric centre of the second region.

In short, the use of a rotationally asymmetric decentred second region of a contact lens may be used to reduce the rate of myopia progression and the reduction of myopia progression may be maintained substantially consistent over time by introducing a spatially and temporally varying stop signal by virtue of a peripheral non-optical symmetric carrier zone.

FIG. 1 shows an exemplary contact lens embodiment (100) in the frontal view (100a) and cross-sectional (100b) view, not to scale. The frontal view of the exemplary contact lens embodiment (100) further illustrates an optic centre (101), an optic zone (102), a blend zone (103), a carrier zone (104), a lens diameter (105) and a decentred second region within the optic zone (106) with a geometric centre (107). In this exemplary example, the lens diameter is approximately 14 mm, the optic zone is approximately 8 mm in diameter, the blend zone is approximately 0.25 mm wide, the symmetrical carrier zone is approximately 2.75 mm wide and the second region (106) within the optic zone is approximately 1.5 mm×2 mm wide. The geometric centre (107) of the decentred second region (106) is 3 mm away from the optic centre (101).

Figure 2:
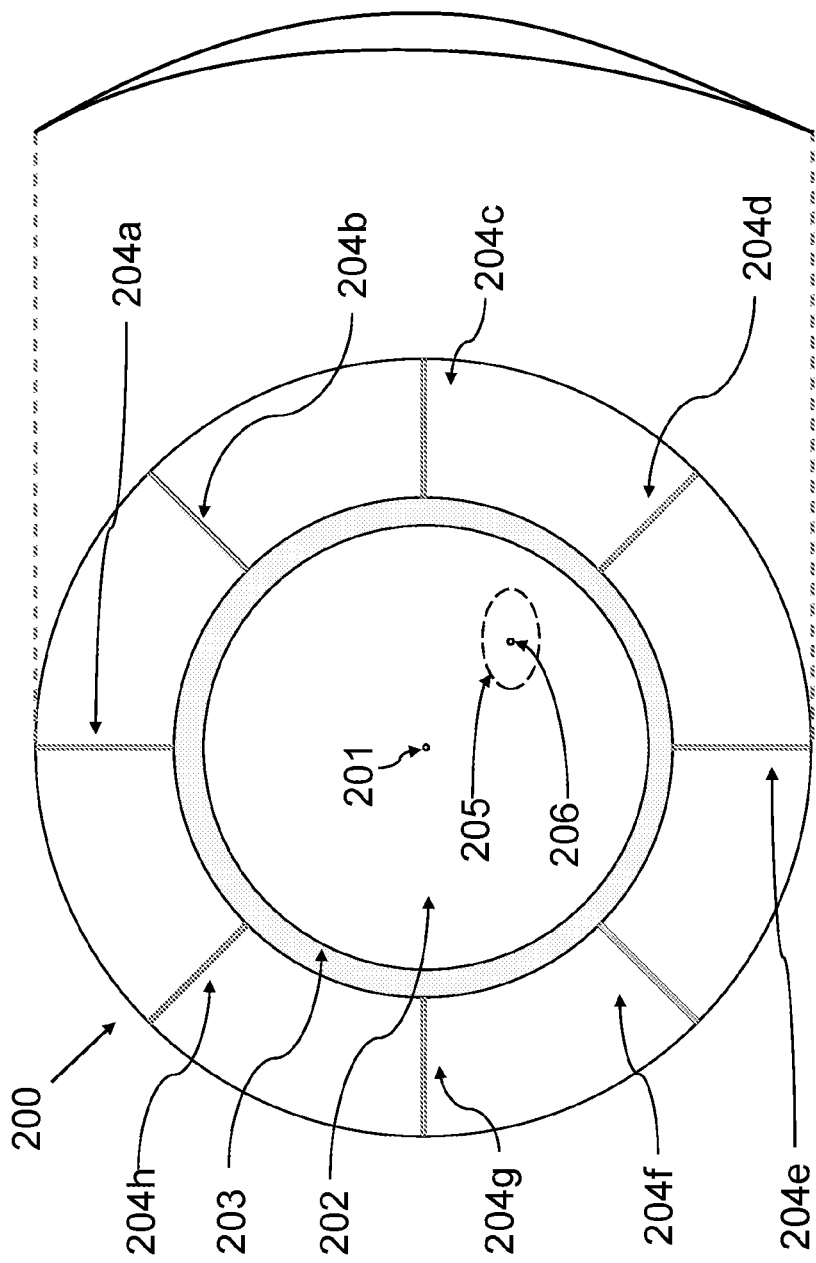
FIG. 2 illustrates the frontal view and a cross-sectional view of another contact lens embodiment. The optic zone of the embodiment substantially comprises of a base prescription and a decentred second region configured with an astigmatic, or toric, or asymmetric, power profile about its geometric centre. The frontal view further illustrates that the radial cross-sections of the carrier zone of an embodiment with substantially similar thickness, according to certain embodiments. The substantial portion of the optic zone bar the second region is configured the base prescription; wherein the base prescription comprises the prescription to correct the foveal refractive error of wearer. The power distribution within the decentred second region of the optic zone determines the magnitude, position, location, orientation of the directional cues imposed on or about the peripheral retina.

FIG. 2 shows the frontal view and a cross-sectional view of an exemplary contact lens embodiment (200), not to scale. The frontal view of the exemplary contact lens embodiment further illustrates an optic centre (201), an optic zone (202), a blend zone (203), a peripheral carrier zone (204) and a second region within the optic zone (205) with a geometric centre (206).

In this exemplary example, the lens diameter is approximately 14 mm in diameter and the distance correction portion of the optic zone is rotationally symmetric along the optical axis. The second region (205) within the optic zone is elliptical, i.e. approximately 2 mm wide in the horizontal meridian and approximately 1.5 mm in the vertical meridian. The blend zone (203) is approximately 0.1 mm wide and the symmetrical peripheral carrier zone (204) is approximately 2.75 mm wide. The radial cross-sections (204a to 204h) of the symmetrical peripheral carrier zone (204) have substantially similar thickness profiles. The second region (205) is configured with a toric or an astigmatic power distribution along the geometric centre (206) providing a stop signal.

In certain embodiments, the differences in the thickness profiles along the different radial cross-sections (204a to 204h) may be configured to achieve the desired on-eye rotation about the optical centre of the lens.

A preferred on-eye rotation can be achieved by keeping the peripheral thickness profile rotationally symmetric across all half meridians. For example, the radial thickness profiles (for example 204a to 204h) may be configured such that the thickness profiles of any of the other radial cross-sections are substantially identical or within 4%, 6%, 8%, or 10% variance for any given distance from the centre of the lens.

In one example, the radial thickness profile 204a is within 5%, 8% or 10% variance of the radial thickness profile of 204e for any given distance from the centre of the lens. In another example, the radial thickness profile 204c is within 4%, 6% or 8% variance of the radial thickness profile of 204g for any given distance from the centre of the lens.

In yet another example, the radial thickness profiles, for example, 204a to 204h, may be configured such that the thickness profiles of any of the cross-sections are within 4%, 6%, 8%, or 10% variation of the average of all radial cross sections for any given distance from the centre of the lens.

To ascertain if the manufactured radial thickness profiles, for example, 204a to 204h, of the non-optical peripheral carrier zone conform to their nominal profiles, cross-sectional measurements of thickness along the azimuthal direction of the contact lens at a defined radial distance may be desired.

In some other examples, the peak thickness measured in one radial cross-section may be compared with the peak thickness measured in another radial cross-section of the non-optical peripheral carrier zone.

In some embodiments, the difference in the peak thicknesses between one or more radial cross-sections may be no greater than 20 µm, 30 µm, 40 µm, 50 µm, or 60 µm. In some embodiments, the difference in the peak thicknesses between one or more perpendicular radial cross-sections may be no greater than 20 µm, 30 µm, 40 µm, 50 µm, Or 60 µm.

In this exemplary example, the sphere power of the base prescription of the optic zone (202) of the contact lens embodiment (200) has a sphere power of −3 D to correct a −3 D myopic eye and the decentred second region is configured with a toric, or astigmatic, power of +1.25 DC to introduce a regional conoid of Sturm at the retina of the eye. In some other examples of the present disclosure, the sphere power of the contact lens to correct and manage myopic eyes may be between −0.5 D to −12 D and the desirable astigmatic, or toric, power within the decentred second region to introduce the desired regional conoid of Sturm at the retina of the eye at the retina of the myopic eye may range between +0.75 DC to +2.5 DC.

Figure 3:
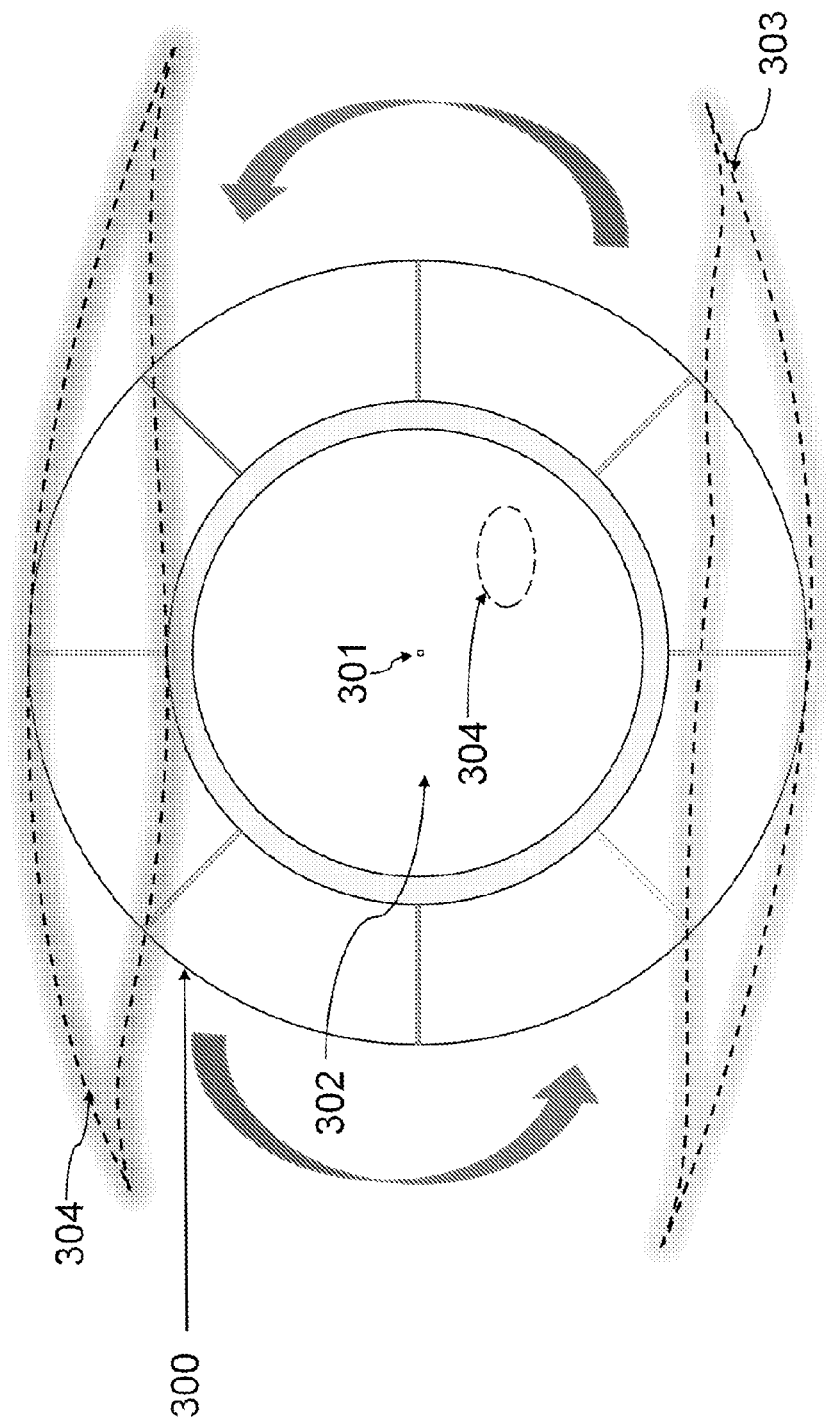
FIG. 3 illustrates the frontal view of, yet another contact lens embodiment disclosed herein. The frontal view further illustrates a potential free rotation of the contact lens substantially around the optical centre due to the configuration of the carrier zone design. The substantially free rotation of the contact lens is facilitated by its carrier zone designed with substantially similar radial thickness profiles, according to certain embodiments.

FIG. 3 shows the frontal view of the exemplary contact lens embodiment illustrated in FIG. 2. This figure attempts to further illustrate the effects of eyelids, lower (302) and upper (303) on the orientation of the contact lens embodiment (300), particularly the optical zone (302) which is configured with a rotationally asymmetric second region with an astigmatic, or toric, or asymmetric, power profile (304).

Due to the natural blink facilitated by the combined action of the upper (304) and lower (303) eyelids, the contact lens (300) may freely rotate on or around about the optical centre (301). This orientation and location of the astigmatic stimulus imposed by the rotationally asymmetric second region (304) within the optical zone (302) to vary with blink (substantially free rotation and/or decentration), resulting in a temporally and spatially varying stimulus to reduce the rate of progression in a myopic wearer substantially consistent over time.

In some embodiments, for example, as described with reference to FIGS. 2 and 3, the contact lens is designed to exhibit substantially free rotation, at least under the influence of natural blinking action. For example, throughout a day of lens wear, preferably over 6 to 12 hours, the eyelid interaction will dispose the contact lens to be oriented in a large number of different orientations or configurations on the eye. Due to the astigmatic, or toric, or asymmetric, optics configured within the decentred second region of the said contact lens, the directional cues to control the rate of eye growth can be configured vary spatially and temporally.

In some embodiments, the surface parameters of the contact lens embodiment, for example, the back-surface radius and/or asphericity may be tailored to an individual eye such that a desired on-eye rotation of the contact lens may be achieved. For example, the said contact lens may be configured to at least 0.3 mm flatter than the radius of curvature of the flattest meridian of the cornea of the eye to increase the occurrences of on-eye rotation during lens wear.

In certain embodiments, it is understood that the substantially free rotation of contact lens embodiment of the present disclosure is only a desired outcome for one aspect of the invention. However, in instances where the achieved substantially free rotation is less than desired, for example, a rotation of fewer than 20 degrees within 1 hour of lens wear and less than 360 degrees once per day, the invention of the present disclosure is still capable of producing a temporally and spatially varying stop signal by mere random orientation of the lens which is governed by the orientation of the contact lens at the time of insertion.

Figure 4:
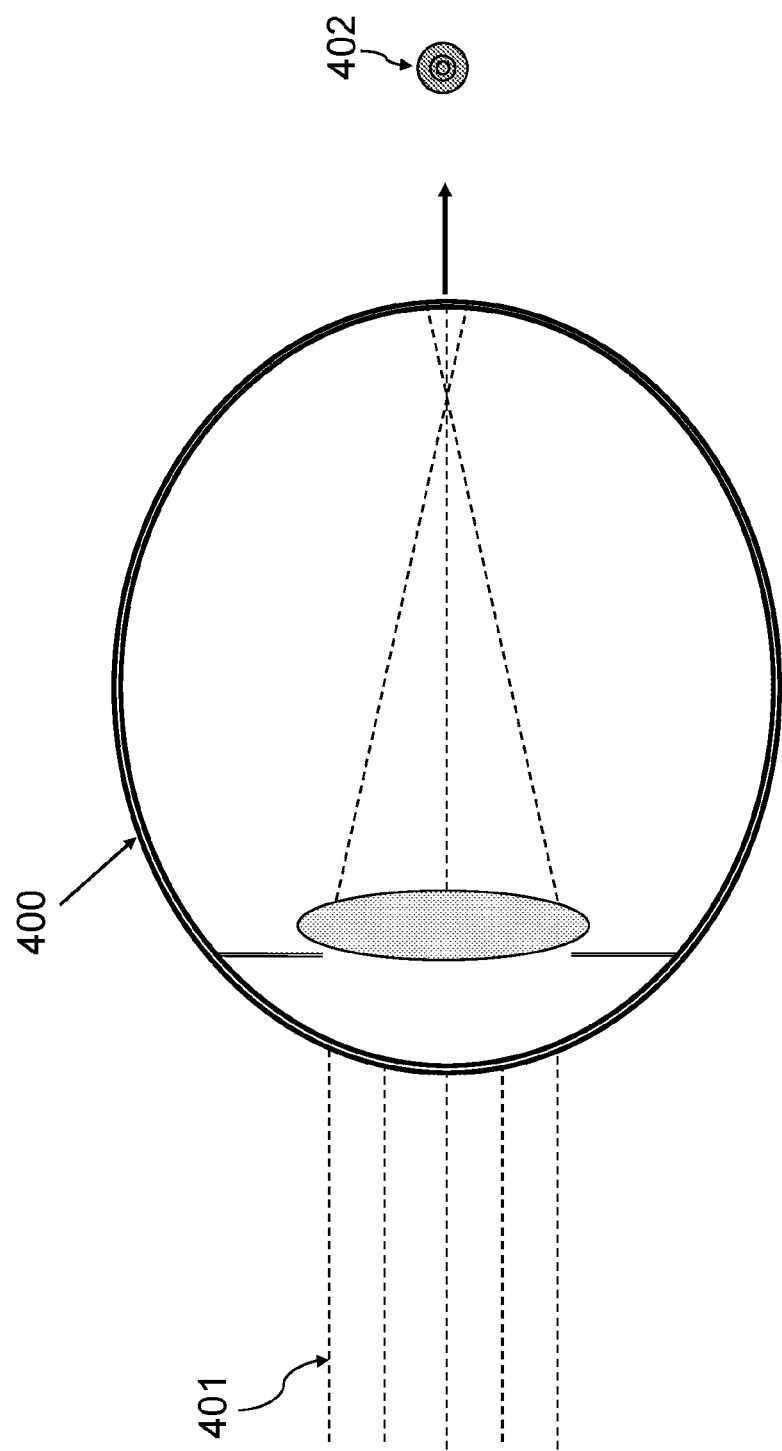
FIG. 4 illustrates a schematic diagram of an on-axis, geometric spot analysis at the retinal plane, when the incoming light, with a visible wavelength (for example, 589 nm) and a vergence of 0 D, is incident on an uncorrected −3 D myopic model eye.

FIG. 4 shows an uncorrected −3 D myopic model eye (400). When the incoming light (401) of a visible wavelength (for example, 555 nm) of a vergence 0 D, is incident on the uncorrected myopic eye, the resultant image on the retina has a symmetrical blur (402) caused by defocus. This schematic diagram represents an on-axis, geometric spot analysis at the retinal plane.

Figure 5:
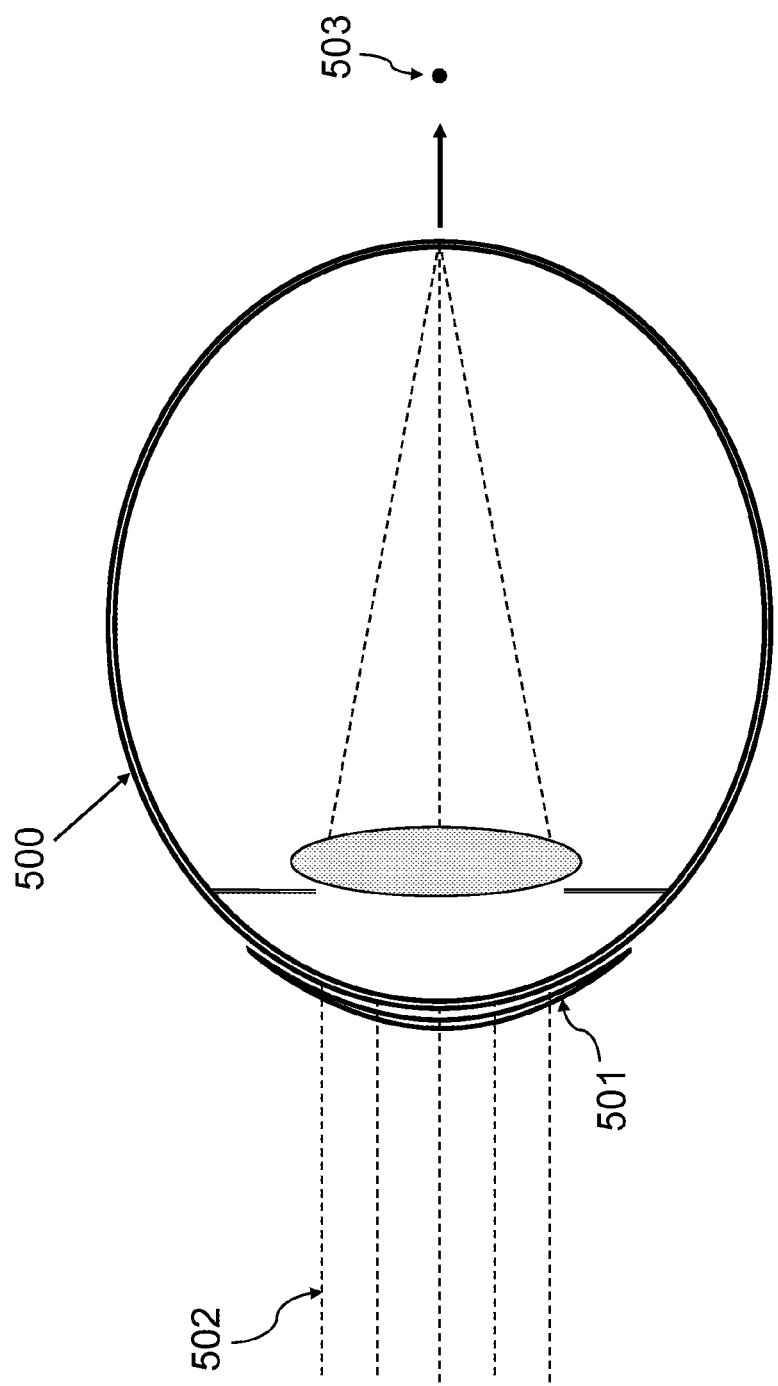
FIG. 5 illustrates a schematic diagram of an on-axis, geometric spot analysis at the retinal plane, when the incoming light, with a visible wavelength (for example, 589 nm) and a vergence of 0 D, is incident on a −3 D myopic model eye corrected with a single vision contact lens of the prior art.

FIG. 5 shows the schematic diagram of an on-axis, geometric spot analysis at the retinal plane when the −3 D myopic model eye (500) of FIG. 4 is corrected with a single vision spherical contact lens of the prior art (501). Here in this example, when the incoming light (502) of a visible wavelength (for example, 555 nm) of a vergence 0 D, is incident on the corrected myopic eye, the resultant image on the retina has a symmetrical sharp focal point (503).

Figure 6A:
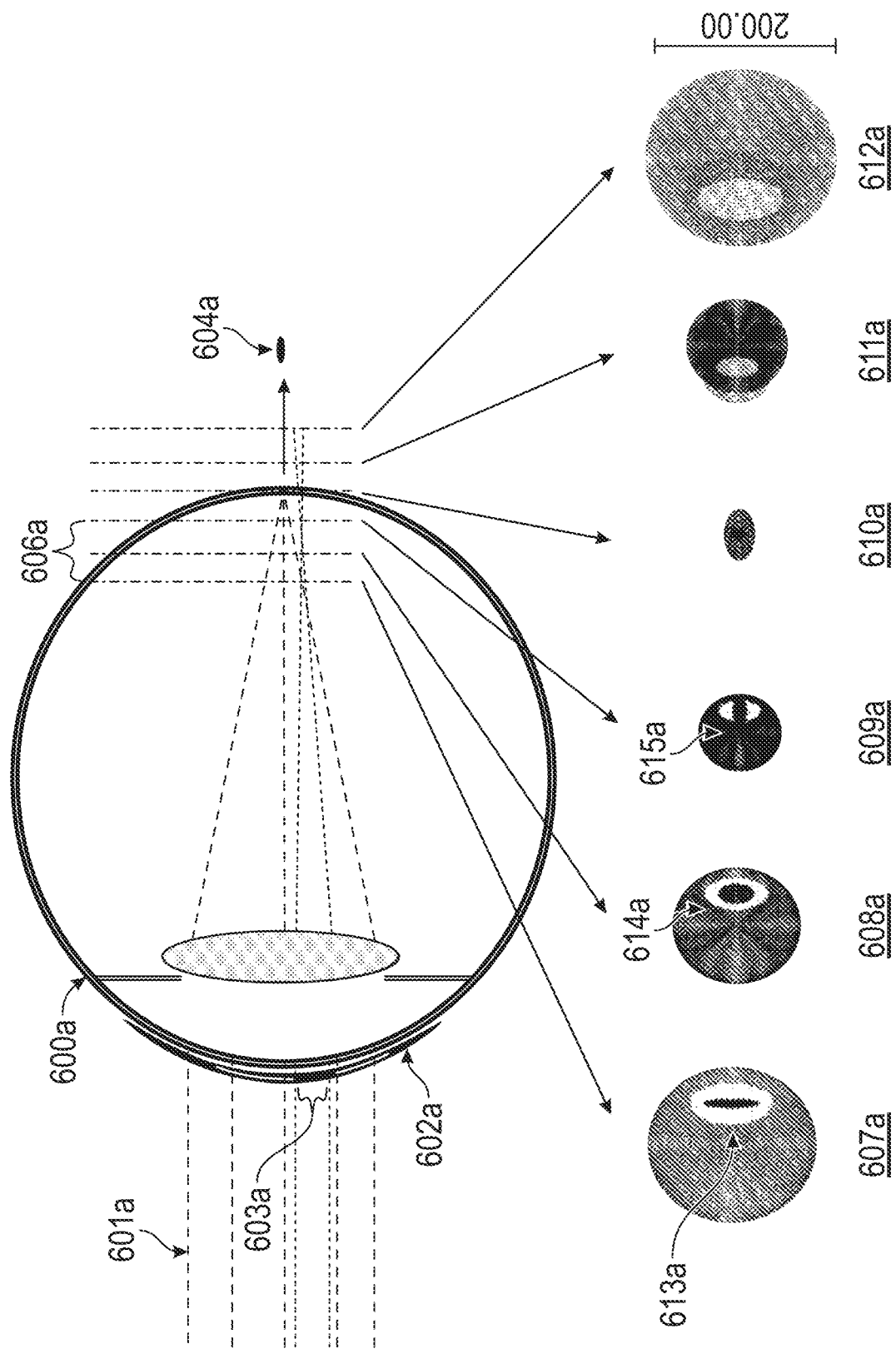
FIG. 6A illustrates a schematic diagram of an on-axis, through-focus geometric spot analysis at the retinal plane, when the incoming light, with a visible wavelength (589 nm) and a vergence of 0 D, is incident on a −3 D myopic model eye corrected with one of the contact lens embodiments disclosed herein. The figure further illustrates the spatially variant regional conoid of Sturm at the retinal level caused due to the rotationally asymmetric decentred second region configured within the optic zone. The illustrated regional conoid of Sturm may also be configured spatially and temporally variant, according to other embodiments.

FIG. 6A shows the schematic diagram of an on-axis, through-focus, geometric spot analysis about the retinal plane when the −3 D myopic model eye (600a) of FIG. 4 is corrected with one of the exemplary embodiment (602a) configured with astigmatic power distribution within the decentred second region (603a) of the optic zone of the exemplary embodiment (602a). In this example, when the incoming light (601a) of a visible wavelength (for example, 589 nm) of a vergence 0 D, is incident on the myopic eye (600a) through the exemplary contact lens embodiment (602a), the incoming light results in a through-focus image profile, encompassing a series of geometric spot distributions depicted from 607a to 612a. The astigmatic, or toric, power distribution configured within the decentred second region (603a) of the optical zone (602a) results in a regional conoid or an interval of Sturm (606a) within the through-focus image profile (607a to 609a), formed substantially in front of the retina.

As can be seen in FIG. 6A, the regional conoid or interval of Sturm about the retinal plane formed by the decentred second region within the optic zone can be observed by inspecting the through-focus spot diagrams (607a, 608a and 609a). Each of the three (3) spot diagrams have a diffuse spread of rays or light energy over about 200 μm central region of the retina (607a, 608a and 609a). Within each of the through-focus spot diagram, there is at least one distinct region formed with minimal spread of rays or light energy, can be seen as white ellipses, that contain the conoid or interval of Sturm (613a, 614a and 615a). The size of three white ellipses encompassing each of the tangential plane (613a), the circle of least confusion (614a) and the sagittal blur pattern (615a) are progressively smaller as they approach the retina. The length, orientation, and position of the conoid or interval of Sturm, more specifically the tangential and sagittal blur patters constitute the directional cues serving as optical stop signals for this invention, as disclosed herein.

The through-focus image profile in front of the retina (607a to 609a) contains the tangential elliptical blur pattern (613a), a circle of least confusion (614a) and the sagittal elliptical blur pattern (615a), as depicted within the sub-region of the series of geometric spot distributions formed in the parafoveal or paramacular region. The resultant image (604a) on the foveal region is depicted as a minimal elliptical blur pattern, as seen in its zoomed-in version (610a). As can be seen, the section of the through-focus image profile formed behind the retina (611a and 612a) are out of focus.

In this example, the contact lens embodiment (602a) with the rotationally asymmetric decentred second region within the optical zone (603a), is configured in a way that the regional conoid or the interval of Sturm (606a) is in its entirety in front of the retinal plane. However, in other exemplary embodiments, the interval of Sturm may be configured in a way that it is on or about the retinal plane or entirely behind the retina. In some embodiments, the depth of the regional conoid or interval of Sturm can be at least 0.3, 0.4, 0.5, 0.6, or 0.75 mm.

In other embodiments, the regional conoid or interval of Sturm may be configured to be at least +1 DC, +1.25 DC, +1.5 DC, +1.75 DC or at least +2 DC. In some embodiments, the positioning of the regional conoid or interval of Sturm may be configured to be in front, or behind the retina. Further, due to the rotational symmetry configured in the peripheral carrier zone, the orientation and location of the astigmatic stimulus in the decentred second region (603) (stop signal) imposed on the retina vary with natural blink action substantially over time, leading to a temporally and spatially varying stop signal due to the rotation and decentration of the contact lens.

In some examples, the said regional conoid of Sturm is configured further away from the sub-foveal, foveal, sub-macular, macular, or para-macular regions. In some examples, the said regional conoid of Sturm may be configured at a wider field angle on the retina, for example at least 5 degrees, at least 10 degrees, at least 20 degrees, or at least 30 degrees.

Specific structural and functional details disclosed in these figures and examples are not to be interpreted as limiting, but merely as a representative basis for teaching a person skilled in the art to employ the disclosed embodiments in numerous other variations.

A schematic model eye (Table 1) was chosen for illustrative purposes in FIGS. 4 to 6. However, in other exemplary embodiments, schematic raytracing model eyes like Liou-Brennan, Escudero-Navarro and others may be used instead of the above simple model eye. One may also alter the parameters of the cornea, lens, retina, ocular media, or combinations thereof, to aid further simulation of the embodiments disclosed herein.

The examples provided herein have used a −3 D myopic model eye to disclose the present invention, however, the same disclosure can be extended to other degrees of myopia, for example, −1 D, −2 D, −5 D or −6 D. Further, it is understood that a person skilled in the art can draw extensions to eyes with varying degrees of myopia in conjunction with astigmatism up to 1 DC.

In the example embodiments, reference was made to a specific wavelength of 555 nm, however, it is understood that a person skilled in the art can draw extension to other visible wavelengths between 420 nm and 760 nm. Certain embodiments of the present disclosure are directed to contact lenses that may provide a temporally and spatially varying, in other words varying substantially in retinal location over time, stop signal to the progressing myopic eye, achieved with the help of the natural on-eye rotation and decentration of the contact lens occurring due to the natural blink action. This temporally and spatially varying stop signal may minimise the implicit saturation effects of efficacy that are observed in the prior art.

Certain embodiments of the present disclosure are directed to contact lenses that may provide a spatially and temporally varying stop signal to the progressing myopic eye no matter in which orientation the contact lens is worn, or inserted, by the wearer. In some embodiments of the present disclosure, the stop signal in the decentred second region of the optic zone may be configured using an astigmatic, or toric, or asymmetric, power profile. The astigmatic, or toric, or asymmetric, power profile within the second region of the optic zone may be configured using a radial and/or an azimuthal power distribution along the geometrical centre of the said second region.

Figure 6B:
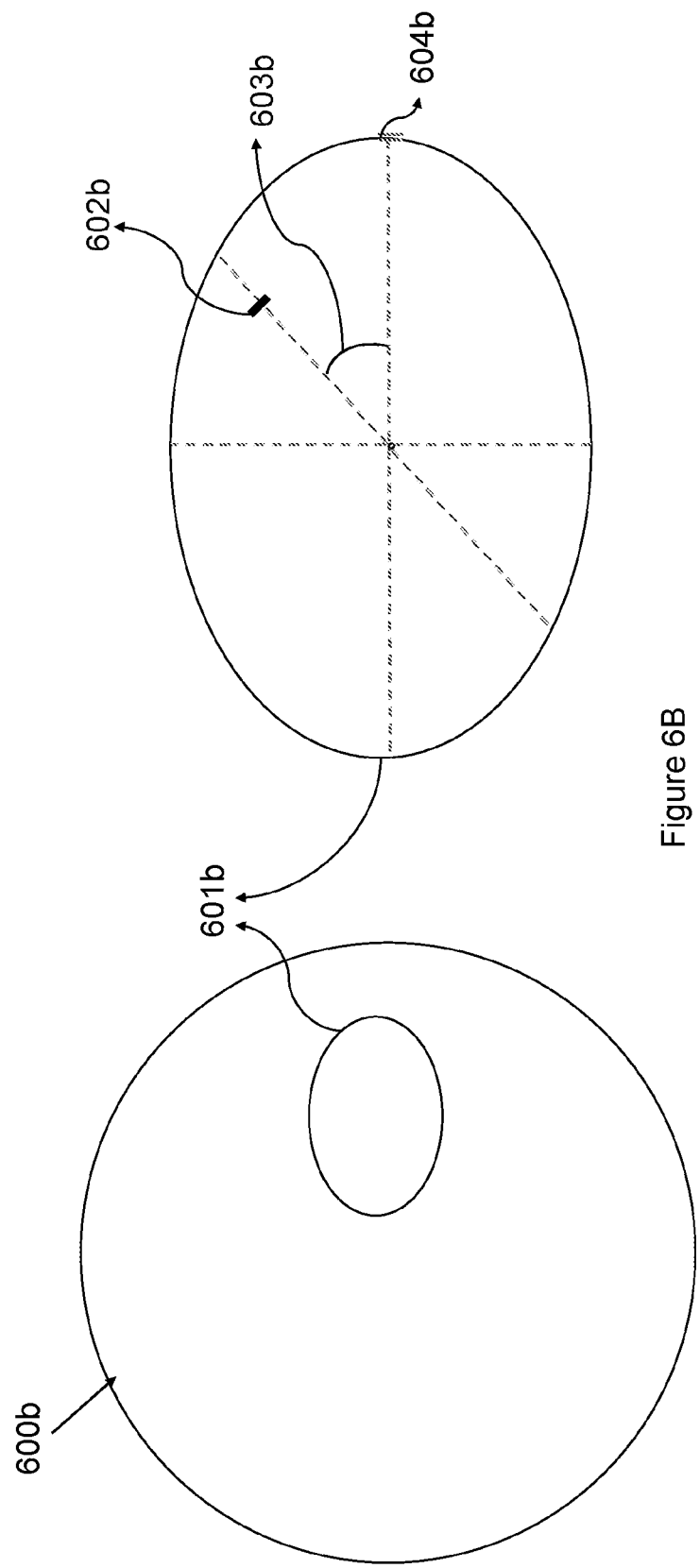
FIG. 6B illustrates a schematic diagram of a zoomed-in section of only the second region of the optical zone of one of the contact lens embodiments disclosed herein. The power profile distribution within the second region of the optical zone of the present embodiment is configured using radial and azimuthal power distribution functions with the geometric centre of the second region as a reference, as disclosed herein.

FIG. 6B illustrates a schematic diagram of a zoomed-in section of the second region (601b) within the optical zone of one of the contact lens embodiments (600b) defined with a toric, or astigmatic, asymmetric, power distribution disclosed herein.

In certain embodiments of the present disclosure, the astigmatic, or toric, or asymmetric, power distribution of the second region within the optic zone may be configured using the below: (Radial)*(Azimuthal) functions. In some embodiments, the radial function may take a form of Radial power distribution=$C\rho^2$, where C is the coefficient of the expansion and Rho ($\rho$) (602b) is the normalised radial co-ordinate $\rho_0/\rho_{max}$. Rho ($\rho_0$) is the radial coordinate at a given point, whereas $\rho_{max}$ is the maximum radial co-ordinate or semi-diameter (604b) of the second region (601b) within the optic zone. In some embodiments, the azimuthal power distribution function may take a form of Azimuthal power distribution=cos mθ, where m can be any integer between 1 and 6 in some embodiments, and Theta (θ) is the azimuthal angle (603b).

In certain contact lens embodiments, a substantial portion of the optical zone provides a substantial foveal correction for a myopic eye, and the decentred second region within the optical zone provides at least in part a regional conoid of Sturm serving as a directional cue to reduce the rate of myopia progression; the contact lens is further configured to provide a temporally and spatially varying stop signal to reduce the rate of myopia progression substantially consistent over time. In certain other embodiments, the optical stop signals configured using a decentred second region in the optic zone, defined rotationally asymmetric about the geometric centre of the second region, provides a regional conoid or interval of Sturm on or about the peripheral retina; wherein the depth of the said regional conoid or interval of Sturm is at least +0.5 DC, +0.75 DC, +1 DC, +1.25 DC, +1.5 DC, +1.75 DC, or +2 DC.

In certain other embodiments, the optical stop signals configured using a decentred second region in the optic zone, defined rotationally asymmetric about the geometric centre of the second region, provides a regional conoid or interval of Sturm on or about the peripheral retina; wherein the depth of the said regional conoid or interval of Sturm ranges between +0.5 DC and +1.25 DC, +0.75 DC and +1.25 DC, +0.5 DC and +1.5 DC, +1 DC and +1.75 DC or +1.5 DC and +2 DC.

In certain other embodiments, the second region may be defined with sphero-cylindrical prescription; wherein the sphere-cylindrical prescription of the second region is substantially different from the base prescription of the contact lens. In certain other embodiments, the second region may be defined with two principle meridians about the geometric centre of the second region; wherein the power profile of the said principle meridians of the second region is different from the base prescription of the contact lens. In certain other embodiments, the second region may be defined with an asymmetric power map defined about the geometric centre of the second region; wherein the asymmetric power map of the said second region is different from the base prescription of the contact lens.

In certain other embodiments, the optical stop signals configured using a decentred second region in the optic zone, defined rotationally asymmetric about the geometric centre of the second region, provides a regional conoid or interval of Sturm on or about the peripheral retina; wherein the depth of the said regional conoid or interval of Sturm is at least −0.5 DC, −0.75 DC, −1 DC, −1.25 DC, −1.5 DC, −1.75 DC, or −2 DC. In certain other embodiments, the optical stop signals configured using a decentred second region in the optic zone, defined rotationally asymmetric about the geometric centre of the second region, provides a regional conoid or interval of Sturm on or about the peripheral retina; wherein the depth of the said regional conoid or interval of Sturm ranges between −0.5 DC and −1.25 DC, −0.75 DC and −1.25 DC, −0.5 DC and −1.5 DC, −1 DC and −1.75 DC or −1.5 DC and −2 DC.

In certain other embodiments, the optical stop signals configured using a decentred second region in the optic zone, defined rotationally asymmetric about the geometric centre of the second region, provides a regional conoid or interval of Sturm on or about the peripheral retina; wherein the depth of the said regional conoid or interval of Sturm ranges between −0.5 DC and +1.25 DC, −0.75 DC and +1.25 DC, −0.5 DC and +1.5 DC, −0.75 DC and +0.75 DC or −1 DC and +1 DC.

In certain other embodiments, the stop signals configured using a second region in the optic zone, which is rotationally asymmetric about the optical axis or optical centre, may be achieved via the use of more complex optical power profiles using a combination of radial and azimuthal power variation across the second region of interest.

In some other embodiments, the radial and/or azimuthal power distribution across the optic centre may be described by appropriate Zernike polynomials, Bessel functions, Jacobi polynomials, Taylor polynomials, Fourier expansion, or combinations thereof. In other embodiments of the present disclosure, the stop signal configured through the second region within the optical zone may solely use astigmatic, or toric, asymmetric, power profiles.

Schematic model eyes were used for simulation of the optical performance results of the exemplary embodiments of the current disclosure (FIGS. 7 to 15). The prescription parameters of the schematic model eye used for optical modelling and simulation of the performance are tabulated in Table 1. The prescription offers a −3 D myopic eye defined for a monochromatic wavelength of 589 nm.

TABLE 1

Prescription of a schematic model eye that offers a −3 D myopic model eye.

| Comments | Radius (mm) | Thickness (mm) | Refractive Index | Semi Diameter (mm) | Conic Constant |
| --- | --- | --- | --- | --- | --- |
|  | Infinity | Infinity |  | 0.00 | 0.000 |
| Start | Infinity | 5.000 |  | 4.00 | 0.000 |
| Anterior Cornea | 7.75 | 0.550 | 1.376 | 5.75 | −0.250 |
| Posterior Cornea | 6.40 | 3.000 | 1.334 | 5.50 | −0.400 |
| Pupil | Infinity | 0.450 | 1.334 | 5.00 | 0.000 |
| Anterior Lens | 10.80 | 3.800 | 1.423 | 4.50 | −4.798 |
| Posterior Lens | −6.25 | 17.775 | 1.334 | 4.50 | −4.101 |
| Retina | −12.00 | 0.000 |  | 10.00 | 0.000 |

The prescription described in Table 1 should not be construed as an imperative method to demonstrate the effect of the contemplated exemplary embodiment.

It is just one of many methods that may be used by the person skilled in the art for optical simulation purposes. To demonstrate the effects of other embodiments, other schematic model eyes like Atchison, Escudero-Navarro, Liou-Brennan, Polans, Goncharov-Dainty may be used instead of the above schematic model eye.

A person skilled in the art may also alter the parameters of the individual parameters of the model eye; for example, the cornea, lens, retina, media, or combinations thereof, to aid a better simulation of the effect is described. The parameters of the model contact lens exemplary embodiment only simulate the optic zone for the performance effects.

To demonstrate the performance variation as a function of time, the tilt functions on the surface have been used to mimic the rotation that would occur physiologically in vivo. For the simulations of the optical performance results the exemplary embodiments were rotated at 0°, 45°, 90° and 135° for the point spread functions and 0°, 120° and 240° for the through-focus geometric spot analysis.

Figure 7:
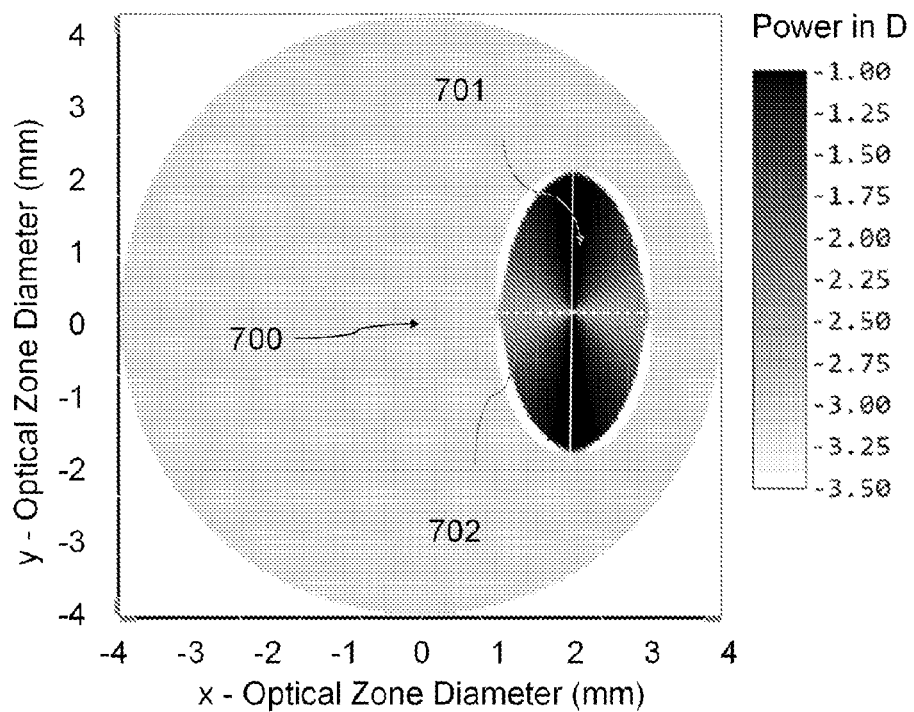
FIG. 7 shows the power map of the entire optic zone of an exemplary embodiment of the current disclosure, including the power map of the decentred second region.

FIG. 7 illustrates the two-dimensional power map (in D) of the exemplary embodiment (Example #1) across an 8 mm optic zone diameter. The optic zone of the exemplary embodiment is meant to be grafted onto a substantially rotationally symmetric non-optical peripheral carrier zone. The contact lens has a sphere power of −3 D in the optic zone to correct the −3 D myopic eye and a toric or an astigmatic power distribution in the second region within the optic zone defined with two principle power meridians (not to scale).

The region surrounding the graft of the decentred second region on the optical zone may be smoothed out to minimise any optical jumps in power and to minimise any visual performance degradation caused by significant changes in power caused due to abrupt changes in the surface curvatures at the junction of the said graft of the second region. In some examples, the blending of the decentred second region with the remainder of the optic zone may be achieved by allowing the lathe to spin at a desired or optimal speed while manufacturing the said lens. In some other exemplary embodiments, the blending of the decentred second region with the optic zone may not be the desired outcome.

In FIG. 7, one principle power meridian (−1 D) of the second region is aligned perpendicular to the optical centre of the optical zone and the second principle power meridian (−2.5 D) of the second region is configured to be in parallel to the optical centre of the optic zone.

The difference between the principle power meridians (+1.5 DC) is the astigmatic power of the second region used to impose the optical stop signal as disclosed herein. The geometrical centre of the second region within the optical zone is decentred by 1.5 mm. However, this contact lens example is not meant to be construed as limiting the scope of the disclosure. The two-dimensional power map of the exemplary embodiment only represents the optic zone section of the contemplated embodiment, i.e. zone 102 of FIG. 1 or zone 202 of FIG. 2.

Figure 8:
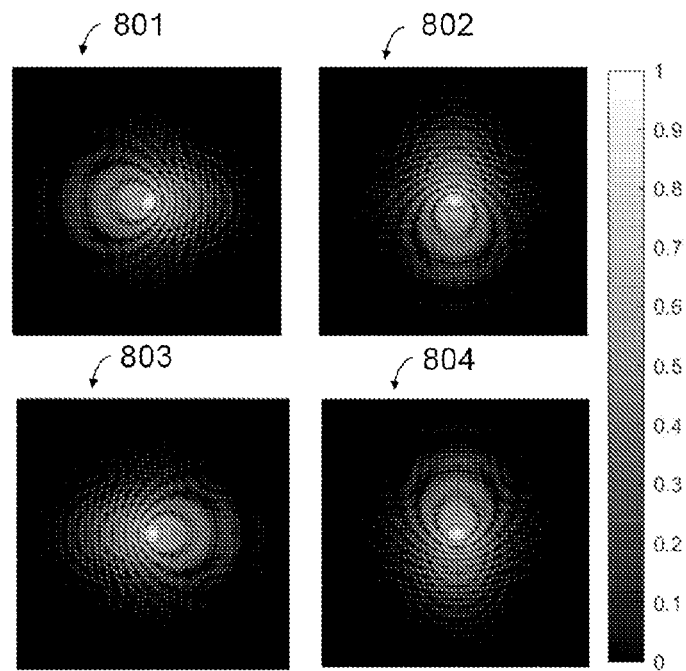
FIG. 8 illustrates the temporally and spatially varying optical signal due to contact lens rotation depicted as on-axis point spread function at the retinal plane, when the incoming light with a visible wavelength (589 nm) and a vergence of 0 D, is incident on a −3 D myopic model eye corrected with the contact lens embodiment described in FIG. 7.

A substantially symmetric non-optical peripheral carrier zone (for example zone 104 of FIG. 1 or zone 204a-h of FIG. 2) will facilitate the substantially free rotation on or around about the optical centre of the proposed contact lens embodiment, as a result of the natural blink facilitated by the combined action of the upper and lower eyelids, which in turn leads to the regional conoid of Sturm (optical stop signal) imposed by the second region within the optical zone to vary with a blink, resulting in a temporally and spatially varying stimulus to reduce the rate of progression in a myopic wearer substantially consistently over time. When the incoming light of a visible wavelength (589 nm) of vergence 0 D, is incident on the myopic eye prescribed by Table 1 and corrected with the optic zone of the exemplary embodiment depicted in FIG. 7 configured on a substantially rotationally symmetrical non-optical peripheral carrier zone (for example the zone 104 of FIG. 1 or zone 204a-h of FIG. 2); the resultant on-axis temporally and spatially varying point spread functions at the retinal plane are illustrated in FIG. 8 with the principle power meridian of the second region within the optic zone being located at 0° (801), 45° (802), 90° (803) and 135° (804).

The rotationally symmetric non-optical peripheral carrier zone of the exemplary embodiment facilitates the regional conoid of Sturm as an optical stop stimulus to vary with natural blink action (temporally and spatially varying signal).

Figure 9:
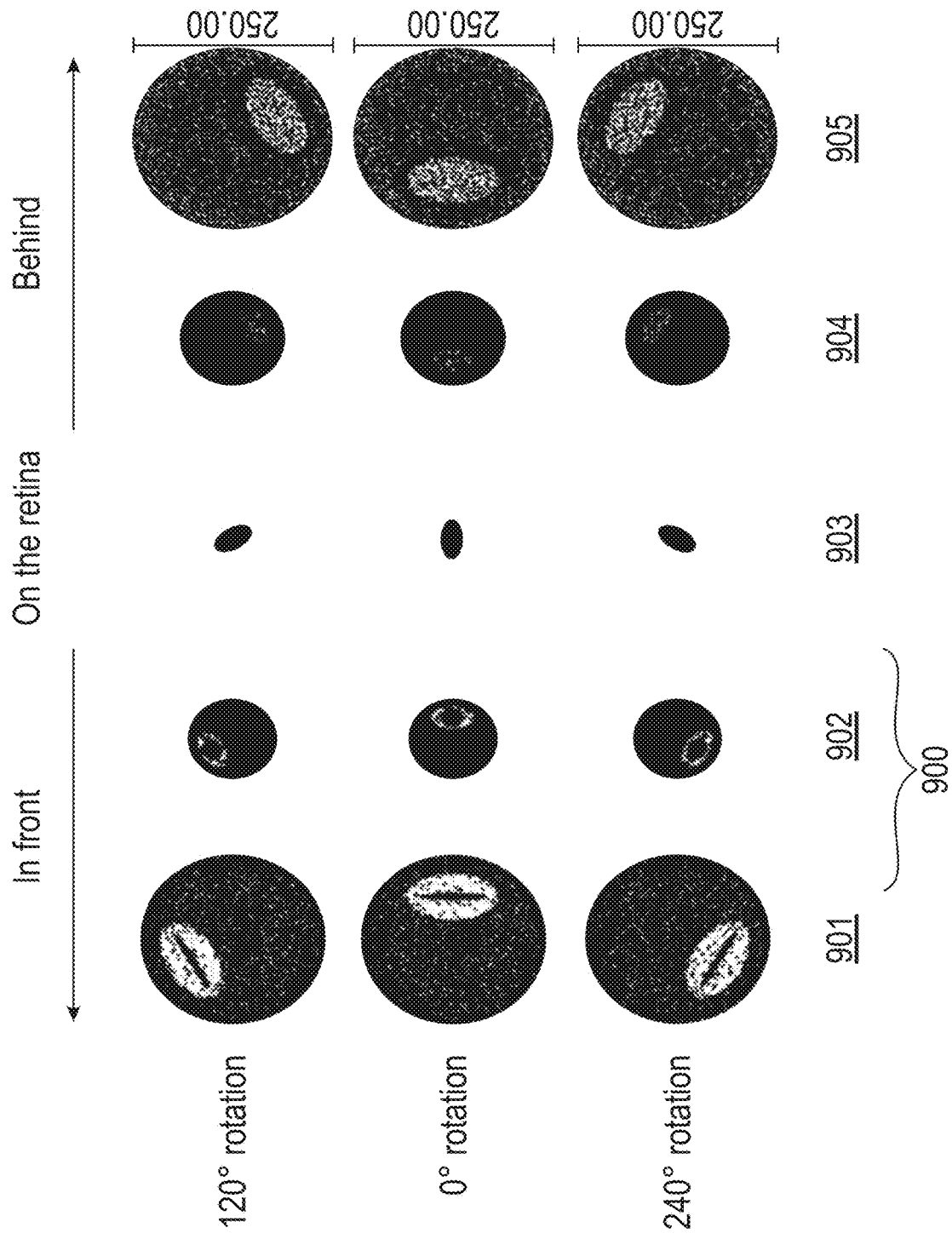
FIG. 9 illustrates the temporally and spatially varying optical signal due to contact lens rotation depicted as through-focus geometric spot analysis, when the incoming light with a visible wavelength (589 nm) and a vergence of 0 D, is incident on a −3 D myopic model eye corrected with the contact lens embodiment described in FIG. 7.

FIG. 9 illustrates the through-focus geometric spot analysis when the −3 D myopic model eye of Table 1 is corrected with one of the exemplary embodiments (Example #1) in three configurations. In this example, the through-focus geometric spot analysis was performed at the following locations: 0.7 mm and 0.35 mm in front of the retina, on the retina and 0.35 mm and 0.7 mm behind the retina.

The on-eye rotation of the contact lens embodiment over time results in three configurations that provide a temporally and spatially varying signal on the retina. In this example, the three configurations represent the test case wherein the principal power meridian of the lens is located at 0°, 120° and 240° azimuthal positions over time with contact lens rotation. In this example, for each contact lens configuration, depicted as rows, the astigmatic or toric power distribution configured within the second region of the optical zone (Example #1) results in a regional conoid or an interval of Sturm (900) that is formed substantially in front of the retina within the through-focus image profile, in the parafoveal or paramacular region.

The regional conoid or interval of Sturm (900) results in elliptical blur patterns with sagittal and tangential planes formed approximately between 901 and 903. The spot images formed behind the retina are out of focus (904 and 905).

As can be seen in FIG. 9, the regional conoid or interval of Sturm about the retinal plane formed by the decentred second region within the optic zone of FIG. 7 can be observed by inspecting the through-focus spot diagram (901) which has a diffuse spread of rays or light energy over about 250 µm central region of the retina (901). Within the through-focus spot diagram, there is a distinct region formed with minimal spread of rays or light energy, can be seen as a white ellipse, that contains the tangential blur pattern of the conoid or interval of Sturm. The orientation of the tangential blur pattern changes with the orientation of the contact lens on the eye, providing temporally and spatially varying directional cues for the eye, as disclosed herein.

Figure 10:
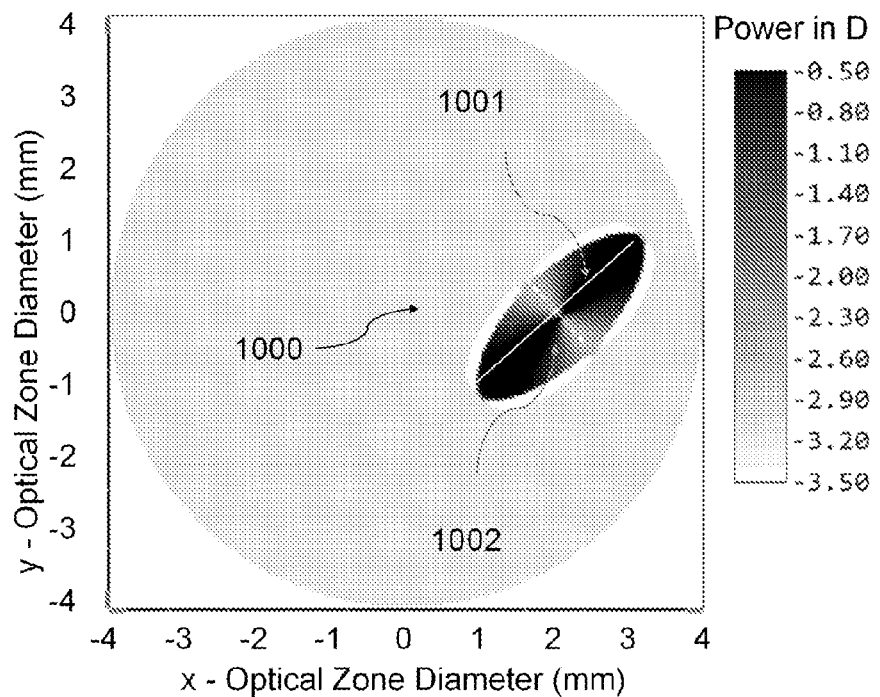
FIG. 10 shows the power map of the entire optic zone of another exemplary embodiment of the current disclosure, including the power map of the decentred second region.

FIG. 10 illustrates the two-dimensional power map (in D) of the exemplary embodiment (Example #2) across an 8 mm optic zone diameter. The optic zone of the exemplary embodiment is meant to be grafted onto a substantially rotationally symmetric non-optical peripheral carrier zone.

The contact lens has a sphere power of −3 D in the optic zone to correct the −3 D myopic eye and a toric or astigmatic power distribution in the second region within the optic zone defined with two principle power meridians.

FIG. 10 further illustrates one principle power meridian (−2.5 D) of the second region is aligned 135° to the optical centre of the optical zone and the second principle power meridian (−0.5 D) of the second region is configured to be 45° to the optical centre of the optic zone. The difference between the principle power meridians (+2 DC) is the astigmatic power of the second region used to impose the optical stop signal as disclosed herein.

The geometrical centre of the decentred second region within the optical zone is decentred by 1.5 mm. However, this contact lens example is not meant to be construed as limiting the scope of the disclosure. The two-dimensional power map of the exemplary embodiment only represents the optic zone section of the contemplated embodiment, i.e. zone 102 of FIG. 1 or zone 202 of FIG. 2.

In this example, the substantially symmetric peripheral non-optical carrier zone (for example zone 104 of FIG. 1 or zone 204*a-h* of FIG. 2) will facilitate the substantially free rotation on or around about the optical centre of the contact lens embodiment as a result of the natural blink facilitated by the combined action of the upper and lower eyelids, which in turn leads to a regional conoid or interval of Sturm as an optical stop signal imposed by the second region of the optical zone to vary with a blink, resulting in a temporally and spatially varying stimulus to reduce the rate of progression of myopia in a myopic wearer substantially consistent over time.

Figure 11:
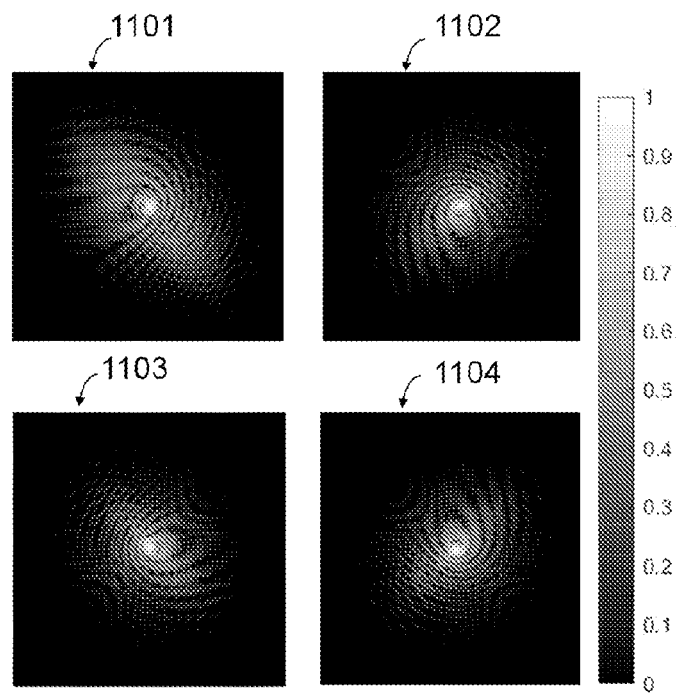
FIG. 11 illustrates the temporally and spatially varying optical signal due to contact lens rotation depicted as on-axis point spread function at the retinal plane, when the incoming light with a visible wavelength (589 nm) and a vergence of 0 D, is incident on a −3 D myopic model eye corrected with the contact lens embodiment described in FIG. 10.

When the incoming light of a visible wavelength (589 nm) of vergence 0 D, is incident on the myopic eye prescribed by Table 1 and corrected with the optic zone of the exemplary embodiment depicted in FIG. 10 configured on a substantially rotationally symmetrical non-optical peripheral carrier zone (for example the zone 104 of FIG. 1 or zone 204*a-h* of FIG. 2); the resultant on-axis temporally and spatially varying point spread functions at the retinal plane are illustrated in FIG. 11 with the principle power meridian of the second region within the optic zone being located at 45° (1101), 90° (1102), 135° (1103) and 210° (1104). The rotationally symmetric non-optical peripheral carrier zone of the exemplary embodiment facilitates the regional conoid or interval of Sturm (optical stop stimulus) to vary with natural blink action (temporally and spatially varying signal).

Figure 12:
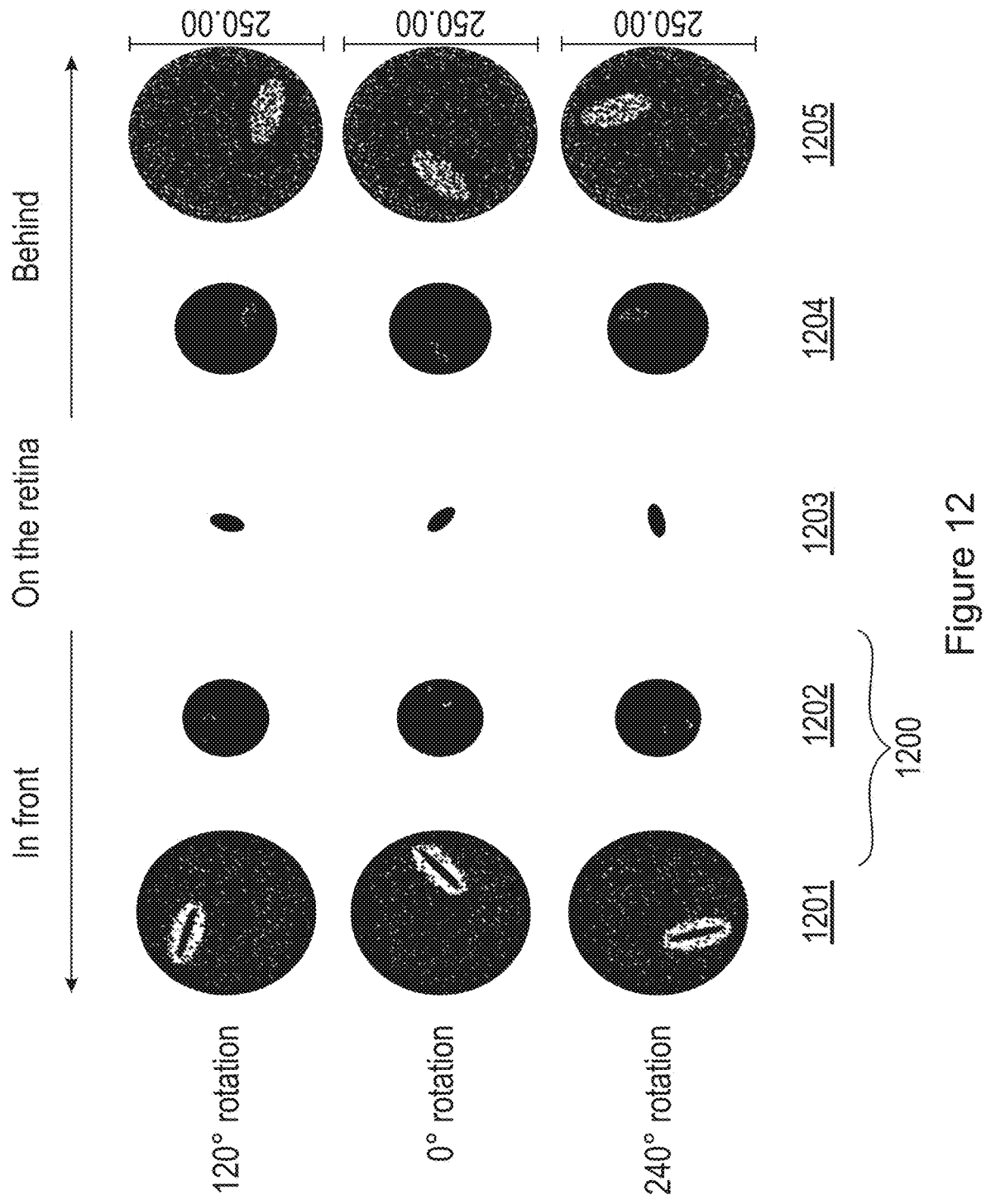
FIG. 12 illustrates the temporally and spatially varying signal due to contact lens rotation depicted as through-focus geometric spot analysis, when the incoming light with a visible wavelength (589 nm) and a vergence of 0 D, is incident on a −3 D myopic model eye corrected with the contact lens embodiment described in FIG. 10.

FIG. 12 illustrates the through-focus geometric spot analysis when the −3 D myopic model eye of Table 1 is corrected with one of the exemplary embodiments (Example #2) in three configurations. In this example, the through-focus geometric spot analysis was performed at the following locations: 0.7 mm and 0.35 mm in front of the retina, on the retina and 0.35 mm and 0.7 mm behind the retina.

The on-eye rotation of the contact lens embodiment over time results in three configurations that provide a temporally and spatially varying signal on the retina. In this example, the three configurations represent the test case wherein the principal power meridian of the lens is located at 0°, 120° and 240° azimuthal positions over time with contact lens rotation.

In this example, for each contact lens configuration, depicted as rows, the astigmatic or toric power distribution configured within the second region of the optical zone (Example #2) results in a regional conoid or an interval of Sturm (1200) that is formed substantially in front of the retina within the through-focus image profile, in the parafoveal or paramacular region.

The regional conoid or interval of Sturm (1200) results in elliptical blur patterns with sagittal and tangential planes formed approximately between 1201 and 1203. The spot images formed behind the retina are out of focus (1204 and 1205).

As seen in FIG. 12, the regional conoid of Sturm about the retinal plane formed by the decentred second region within the optic zone of FIG. 10 can be observed by inspecting the through-focus spot diagram (1201) which has a diffuse spread of rays over about 250 µm central retinal region.

Figure 13:
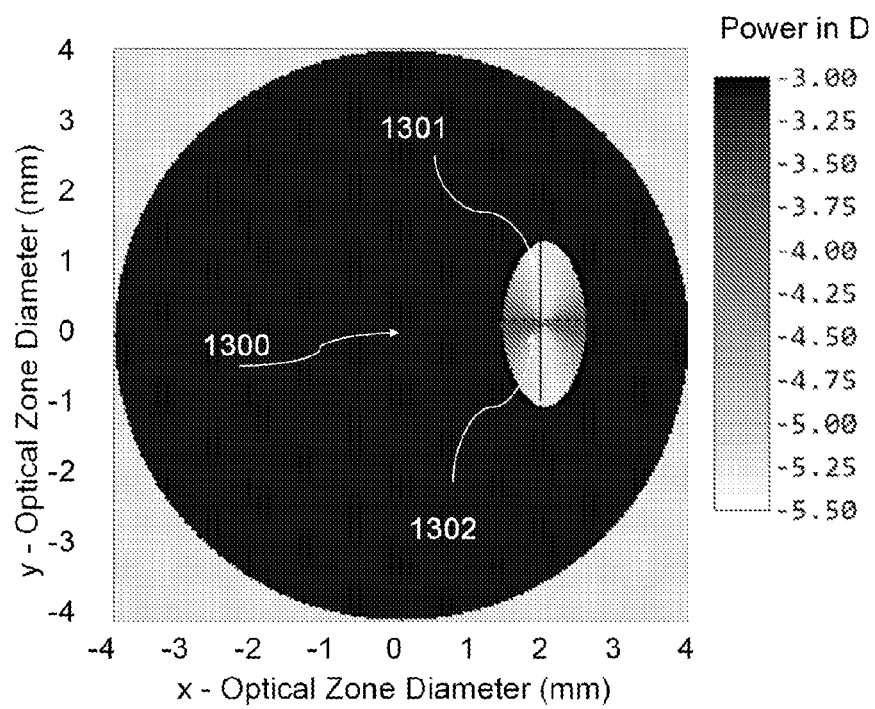
FIG. 13 shows the power map of the entire optic zone of another exemplary embodiment of the current disclosure, including the power map of the decentred second region.

Within the through-focus spot diagram, there is a distinct region formed with minimal spread of rays, seen as a white ellipse, that contains the tangential blur pattern of the conoid of Sturm. The orientation of the tangential blur pattern changes with the orientation of the contact lens on the eye, providing temporally and spatially varying directional cues for the eye, as disclosed herein FIG. 13 illustrates the two-dimensional power map (in D) of the exemplary embodiment (Example #3) across an 8 mm optic zone diameter. The optic zone of the exemplary embodiment is meant to be grafted onto a substantially rotationally symmetric non-optical peripheral carrier zone. The contact lens has a sphere power of −3 D in the optic zone to correct the −3 D myopic eye and a toric or astigmatic power distribution in the second region within the optic zone defined with two principle power meridians.

In this example, one principle power meridian (−5 D) of the second region is aligned perpendicular to the optical centre of the optical zone and the second principle power meridian (−3.5 D) of the second region is configured to be parallel to the optical centre of the optic zone. The difference between the principle power meridians (−1.5 DC) is the astigmatic power of the second region used to impose the optical stop signal as disclosed herein. The geometrical centre of the second region within the optical zone is decentred by 1.5 mm.

However, this contact lens example is not meant to be construed as limiting the scope of the disclosure. The two-dimensional power map of the exemplary embodiment only represents the optic zone section of the contemplated embodiment, i.e. zone 102 of FIG. 1 or zone 202 of FIG. 2.

A substantially symmetric non-optical peripheral carrier zone, for example, similar to the zone 104 of FIG. 1 or the zones 204*a-h* of FIG. 2, will facilitate the substantially free rotation on or around about the optical centre of the proposed contact lens embodiment, as a result of the natural blink facilitated by the combined action of the upper and lower eyelids, which in turn leads to the regional conoid or interval of Sturm by the second region within the optical zone to vary with a blink, resulting in a temporally and spatially varying stimulus to reduce the rate of progression in a myopic wearer substantially consistently over time.

Figure 14:
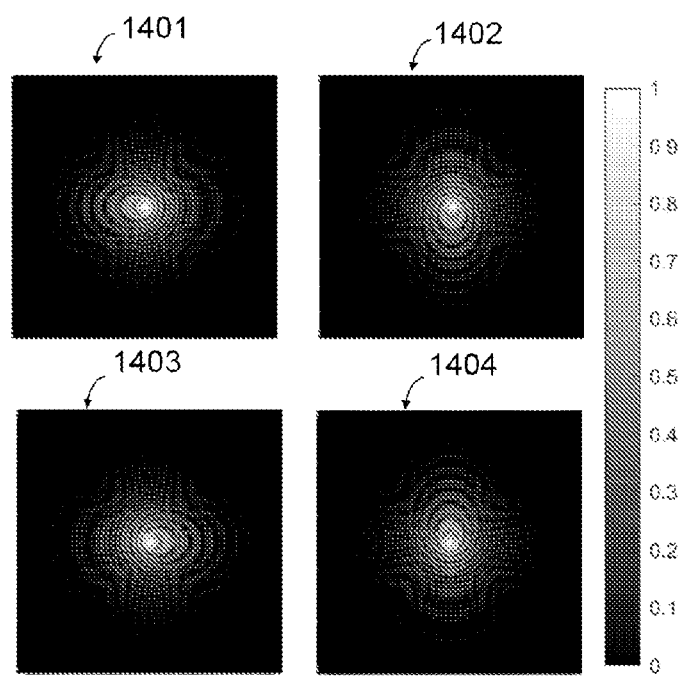
FIG. 14 illustrates the temporally and spatially varying optical signal due to contact lens rotation depicted as on-axis point spread function at the retinal plane, when the incoming light with a visible wavelength (589 nm) and a vergence of 0 D, is incident on a −3 D myopic model eye corrected with the contact lens embodiment described in FIG. 13.

When the incoming light of a visible wavelength (589 nm) of vergence 0 D, is incident on the myopic eye prescribed by Table 1 and corrected with the optic zone of the exemplary embodiment depicted in FIG. 13 configured on a substantially rotationally symmetrical non-optical peripheral carrier zone. For example, as noted in zone 104 of FIG. 1 or the zones 204*a-h* of FIG. 2. The resultant on-axis temporally and spatially varying point spread functions at the retinal plane are illustrated in FIG. 14 with the principle power meridian of the second region within the optic zone being located at 0° (1401), 45° (1402), 90° (1403) and 135° (1404).

The rotationally symmetric non-optical peripheral carrier zone of the exemplary embodiment facilitates the regional conoid or interval of Sturm (optical stop stimulus) to vary with natural blink action (temporally and spatially varying signal).

Figure 15:
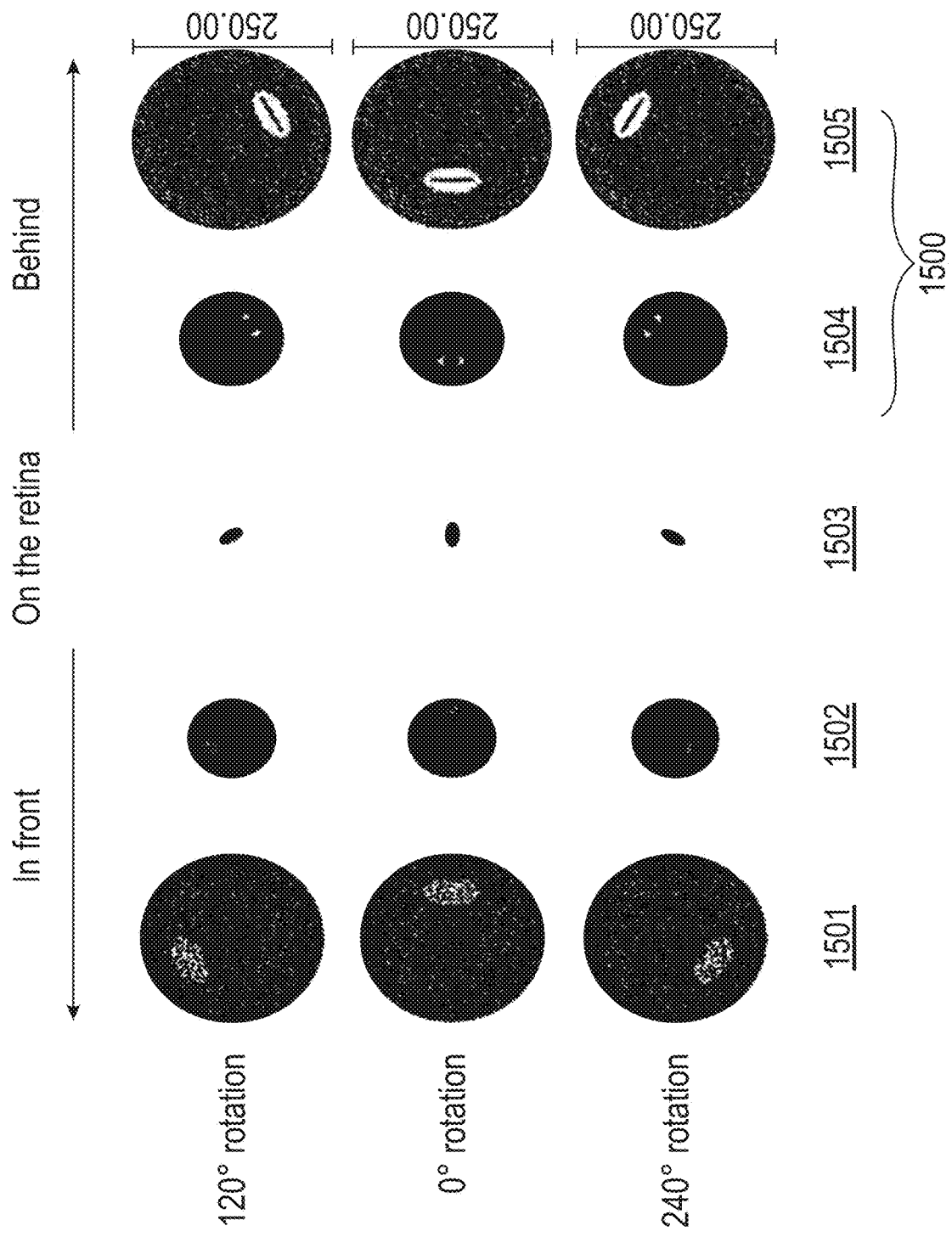
FIG. 15 illustrates the temporally and spatially varying signal due to contact lens rotation depicted as through-focus geometric spot analysis, when the incoming light with a visible wavelength (589 nm) and a vergence of 0 D, is incident on a −3 D myopic model eye corrected with the contact lens embodiment described in FIG. 13.

FIG. 15 illustrates the through-focus geometric spot analysis when the −3 D myopic model eye of Table 1 is corrected with one of the exemplary embodiments (Example #3) in three configurations. In this example, the through-focus geometric spot analysis was performed at the following locations: 0.7 mm (1501) and 0.35 mm (1502) in front of the retina, on the retina (1503) and 0.35 mm (1504) and 0.7 mm (1505) behind the retina. The on-eye rotation of the contact lens embodiment over time results in three configurations that provide a temporally and spatially varying signal on the retina. In this example of FIG. 15, the three configurations represent the test case wherein the principal power meridian of the lens is located at 0°, 120° and 240° azimuthal positions over time with contact lens rotation.

In this example of FIG. 15, for each contact lens configuration, depicted as rows, the astigmatic, or toric, power distribution configured within the second region of the optical zone (Example #3) results in a regional conoid or interval of Sturm (1500) that is formed substantially about the retina, with at least some portion of the regional conoid or interval of Sturm behind the retina, as seen in the through-focus image profile, encompassing the parafoveal or paramacular region, as described herein.

The regional conoid or interval of Sturm (1500) results in elliptical blur patterns with the tangential and sagittal planes formed approximately between 1503 and 1505, that is behind the retina. The spot images formed in front of the retina is blurred and out of focus (1501 and 1502). As seen in FIG. 15, the regional conoid of Sturm about the retinal plane formed by the decentred second region within the optic zone of FIG. 13 can be observed by inspecting the through-focus spot diagram (1505) which has a diffuse spread of rays over about 250 µm central retinal region. Within the through-focus spot diagram, there is a distinct region formed with minimal spread of rays, seen as a white ellipse, that contains the sagittal blur pattern of the conoid of Sturm. The position and orientation of the sagittal blur pattern changes with the orientation of the contact lens on the eye, providing temporally and spatially varying directional cues for the eye, as disclosed herein In certain embodiments, the decentred second region within the optical zone of the contact lens, which is configured rotationally asymmetric about its geometric centre, maybe at least 0.5 mm, 0.75 mm, 1 mm, 1.5 mm, or 2.5 mm wide along the minor axis of the elliptical second region.

In certain embodiments, the decentred second region within the optical zone of the contact lens, which is configured rotationally asymmetric about its geometric centre, maybe at least 0.75 mm, 1.5 mm, 2.5 mm, or 3.5 mm wide along the major axis of the elliptical second region.

In certain embodiments, the decentred second region within the optical zone of the contact lens, which is configured rotationally asymmetric about its geometric centre, maybe between 0.5 mm to 1.25 mm, 0.5 mm to 1.75 mm, 0.75 to 2.5 mm or 0.5 mm to 3.5 mm in diameter along the minor or major axes.

In certain embodiments, the surface area of the decentred second region within the optical zone of the contact lens, which is configured with rotationally asymmetric about its geometric centre, maybe between 0.5 $mm^2$ to 5 $mm^2$, 2.5 $mm^2$ to 7.5 $mm^2$, 5 $mm^2$ to 10 $mm^2$, or 1 $mm^2$ to 25 $mm^2$, in diameter along the minor or major axes.

In certain embodiments, the surface area of the decentred second region is at least 10% and no greater than 35% of the surface area of the optical zone. In certain embodiments, the surface area of the decentred second region is at least 5% and no greater than 30% of the surface area of the optical zone. In certain embodiments, the surface area of the decentred second region is at least 3% and no greater than 20% of the surface area of the optical zone. In certain embodiments, the surface area of the decentred second region is at least 5% and no greater than 40% of the surface area of the optical zone In certain embodiments, the geometric centre of the decentred second region within the optical zone, which is configured rotationally asymmetric about its geometric centre, may be separated from the optical centre by at least 0.75 mm, 1 mm, 1.5 mm, 2 mm, or 2.5 mm.

In certain embodiments, the separation between the geometric centre of the second region within the optical zone configured rotationally asymmetric about its geometric centre, maybe between 0.75 mm to 1.25 mm, 0.75 mm to 1.75 mm, 1 mm to 2 mm or 0.75 mm to 2.5 mm.

In certain embodiments, the optical zone of the contact lens may be at least 6 mm, 6.5 mm, 7 mm, 7.5 mm, 8 mm, 8.5 mm, or 9 mm in diameter. In certain embodiments, the optical zone of the contact lens may be between 6 mm to 7 mm, 7 mm to 8 mm, 7.5 mm to 8.5 mm, or 7 to 9 mm in diameter.

In certain embodiments, the blend zone or blending zone of the contact lens may be at least 0.05 mm, 0.1 mm, 0.15 mm, 0.25 mm, 0.35 or 0.5 mm in width.

In certain embodiments, the blend zone or blending zone of the contact lens may be between 0.05 mm and 0.15 mm, 0.1 mm and 0.3 mm, or 0.25 mm and 0.5 mm in width.

In some embodiments, the blending zone may be symmetrical and yet in some other embodiments, the blending zone may be asymmetrical, for example, elliptical. In other embodiments, the width of the blending zone may be reduced to zero and thus non-existent.

In exemplary embodiments, the shape of the second region within the optical zone may be circular, semi-circular, non-circular, oval, rectangular, hexagonal, square or combinations thereof to introduce the desired stop signal for the progressing myopic eye. In certain embodiments, the area of the second region within the optical zone configured rotationally asymmetric about the optical axis may be at least 5%, 10%, 15%, 20%, 25%, 30% or 35% of the optical zone.

In certain embodiments, the area of the second region within the optical zone configured rotationally asymmetric about the optical axis may be between 5% and 10%, 10% and 20%, 10% and 25%, between 5% and 20%, between 5% to 25%, between 10% and 30% or between 5% and 35% of the optical zone.

In certain embodiments, the peripheral non-optical zone or carrier zone of the contact lens may be at least 2.25 mm, 2.5 mm, 2.75 mm, or 3 mm in width. In certain embodiments, the peripheral zone or carrier zone of the contact lens may be between 2.25 mm and 2.75 mm, 2.5 mm and 3 mm, or 2 mm and 3.5 mm in width.

In certain embodiments, the peripheral zone or the carrier zone of the contact lens is substantially symmetric with substantially similar radial thickness profiles across horizontal, vertical, and other oblique meridians.

In certain embodiments, the peripheral zone or the carrier zone of the contact lens is substantially symmetric with substantially similar radial thickness profiles across horizontal, vertical and other oblique meridians which may mean that the maximum thickness of the peripheral carrier zone across any of the meridians is within 5%, 6%, 7%, 8%, 9%, or 10% variation of the maximum thickness of any other meridian. For the avoidance of doubt, the thickness profiles are measured in the radial direction.

In certain embodiments, the peripheral zone or the carrier zone of the contact lens is substantially symmetric with substantially similar radial thickness profiles across horizontal, vertical and other oblique meridians which may mean that the maximum thickness of the peripheral carrier zone across any of the half meridians is within 5%, 6%, 7%, 8%, 9%, or 10% variation of the maximum thickness of any other half meridian.

In certain embodiments, the peripheral zone or the carrier zone of the contact lens is substantially rotationally symmetric with substantially similar radial thickness profiles across horizontal, vertical and other oblique meridians, which may mean that the thickest point within the peripheral carrier zone across any of the meridians is within a maximum variation of 5, 10, 15, 20, 25, 30, 35, or 40 µm of the thickest peripheral point of any other meridian. the avoidance of doubt, the thickness profiles are measured in the radial direction.

In certain embodiments, the peripheral zone or the carrier zone of the contact lens is substantially rotationally symmetric with substantially similar radial thickness profiles across horizontal, vertical and other oblique meridians, which may mean that the thickest point within the peripheral carrier zone across any of the half meridians is within a maximum variation of 5, 10, 15, 20, 25, 30, 35, or 40 µm of the thickest peripheral point of any other half meridian. For the avoidance of doubt, the thickness profile is measured in the radial direction.

In certain embodiments, the peripheral zone or the non-optical carrier zone of the contact lens is configured to be substantially free of a ballast, a prism ballast, a peri-ballast, a slab-off, a truncation or combinations thereof, which are commonly used in conventional toric contact lenses aimed at stabilising the orientation of the contact lens on the eye.

In certain embodiments, substantially free rotation of the contact lens over time may be a rotation by 360 degrees at least once, twice, thrice, four, five or ten times per day and at least 10, 15, 20, or 25 degrees within 1 hour of lens wear.

In other embodiments, substantially free rotation of the contact lens over time may be a rotation by 90 degrees, at least once, twice, thrice, four, five or ten times per day and at least 10, 15, 20, or 25 degrees within 2 hours of lens wear.

In some embodiments, the rotationally asymmetric decentred second region of the contact lens can be located, formed, or placed on the anterior surface, posterior surface, or combinations thereof.

In some embodiments, the rotationally asymmetric decentred second region of the contact lens can be located, formed, or placed at least in part on the anterior surface, at least part on the posterior surface, or at least in part on the anterior surface and at least in part on the posterior surface.

In some embodiments, the astigmatic, toric, or asymmetric second region of the contact lens is devoted to producing specific features of the stop signal, for example positioning the regional conoid or interval of Sturm induced at a desired location of the peripheral retina.

In some examples, the optics of the decentred second region of the contact lens may be configured to provide a regional conoid or interval of Sturm substantially in front of the retinal plane, be approximately on the retinal plane or be substantially behind the retina plane.

In certain other embodiments, the base prescription of the contact lens located, formed, or placed on one of the two surfaces of the contact lens and the other surface may have other features for further reducing eye growth.

In certain embodiments, the shape of the decentred second region within the optical zone, the blending zones between the decentred second region and the remainder of the optic zone, the blending zones of the optical zone and the peripheral carrier zone may be described by one or more of the following: a sphere, an asphere, an extended odd polynomial, an extended even polynomial, a conic section, a biconic section, or a Zernike surface polynomial.

In certain other embodiments, the decentred second region within the optical zone may have a combination of astigmatism and coma; or a combination of astigmatism and spherical aberration, or combinations thereof.

In certain embodiments, there may be distinct advantages in combining the contact lens embodiments in the disclosure with prescription spectacle lenses; wherein only one single stock-keeping unit with a second region that has a preferred astigmatic, or toric, or asymmetric, power profile of desirable or preferred size and shape, or other device feature may be required to achieve the desired optical effect on the retina. To enhance wearability and varying treatment signals, only one contact lens could be worn alternating daily between left and right eyes.

Another distinct advantage of combining the current contact lens embodiments of the present disclosure with prescription spectacle lenses is to deal with inherently astigmatic eyes; wherein the astigmatic or cylindrical correction can be incorporated into the pair of spectacle lenses.

Again, in such a case, a single stock-keeping unit can then be worn as a contact lens without no concern relating to the overlapping powers of a cylinder and/or induced astigmatism of the decentred second region or any other contemplated device feature.

As a person skilled in the art may appreciate, the present invention may be used in combination with any of the devices/methods that have the potential to influence the progression of myopia.

These may include but are not limited to, spectacle lenses of various designs, colour filters, pharmaceutical agents, behavioural changes, and environmental conditions.

Prototype Contact Lens #1: Design, Metrology and Clinical Data

One prototype contact lens, Lens #1, configured with an optic zone having a spherical power of 0 D with a decentred second region configured with a toric or astigmatic power of +1.5 DC and a rotationally symmetric non-optical peripheral carrier zone was manufactured for the right eye of one consenting research participant to assess the manufacturability, visual performance with the prototype contact lens and also to further gauge the amount of rotation of the contact lens embodiment when worn on the eye over time.

The lens provided clinically acceptable visual performance when compared to single vision correction. The measured base curve, lens diameter and centre thickness values of the Lens #1 were 8.51 mm, 13.73 mm, and 0.148 mm, respectively. The contact lens material was Contaflex 42 (Contamac, UK) which has a measured refractive index of 1.432.

Figure 16A:
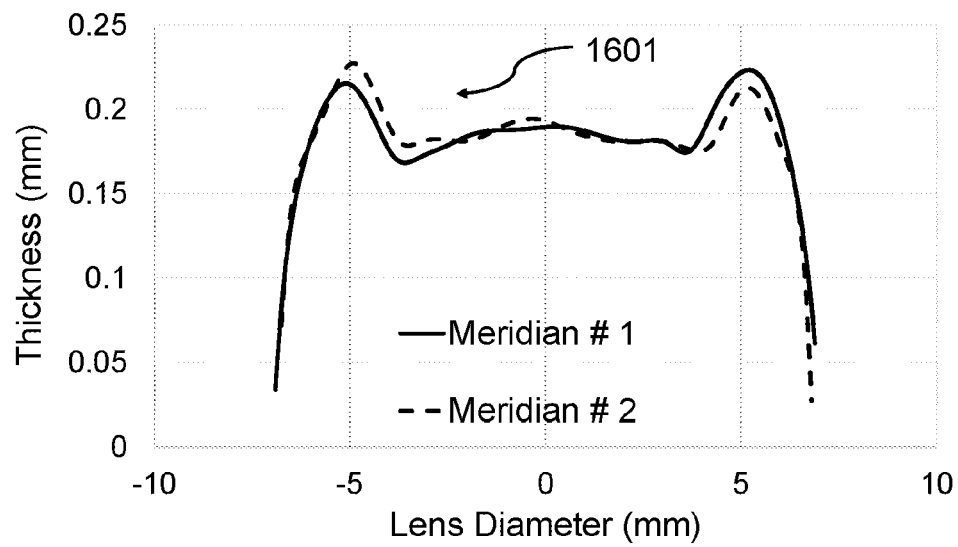
FIG. 16a illustrates the measured thickness profiles for two perpendicular meridians of one prototype contact lens (Lens #1) which is a variant of a contact lens embodiment described in FIG. 7.

FIG. 16a illustrates the measured thickness profiles of a prototype contact lens embodiment (Lens #1), which is a variant of a contact lens embodiment described in FIG. 7.

Figure 16B:
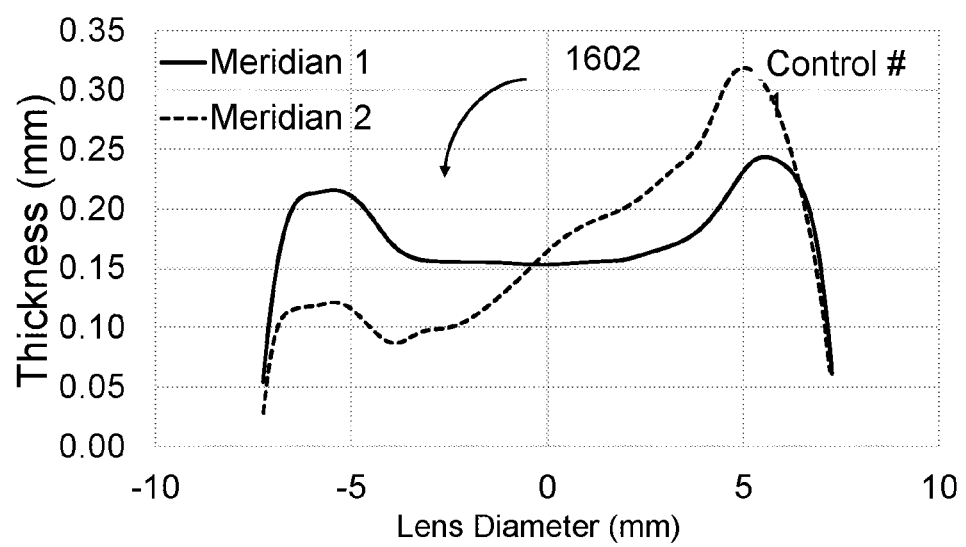
FIG. 16b illustrates the measured thickness profiles for two perpendicular meridians of one commercially available toric contact lens (Control #1).

FIG. 16b illustrates the measured thickness profiles of a commercially available toric contact lens, Control #1. The thickness profiles were measured with Optimec is830 (Optimec Ltd, UK) and the peripheral prism, defined as thickness difference between the two peripheral peaks of the meridians of each lens was determined.

In this example, the data for two perpendicular meridians of Lens #1 (1601) is plotted in FIG. 16a and the data for Control #1 (1602) is plotted in FIG. 16b. The thickness differences for Lens #1 were 27.3 µm and 15.7 µm in Meridians 1 and 2, respectively.

As expected from the nominal design of the peripheral rotationally symmetric non-optical carrier zone of this prototype contact lens, the peripheral thickness differences across both meridians were minimal, providing a peripheral carrier zone that is substantially configured without rotational stabilisation.

In this example, the thickness differences observed for Control #1 (1602) were 198.5 µm and 30 µm for Meridians 1 and 2, respectively. Unlike the thickness profiles and differences of the prototype contact lens embodiment Lens #1 (1601), Control #1 had a significant peripheral prism along Meridian 2. This peripheral prism has the purpose to stabilise the toric contact lens (prior art). While Optimec is830 permits reliable measurements for the peripheral thickness profiles, in the central optic zone the measurement variability of the instrument is increased and the expected thickness difference between the vertical and horizontal meridians of the toric second region within the optic zone of Lens #1 cannot be appreciated from these measurements. Instead, the power mapping instrument NIMOevo (Lambda-X, Belgium) was used to measure and confirm the toricity of the second region of Lens #1.

Figure 17:
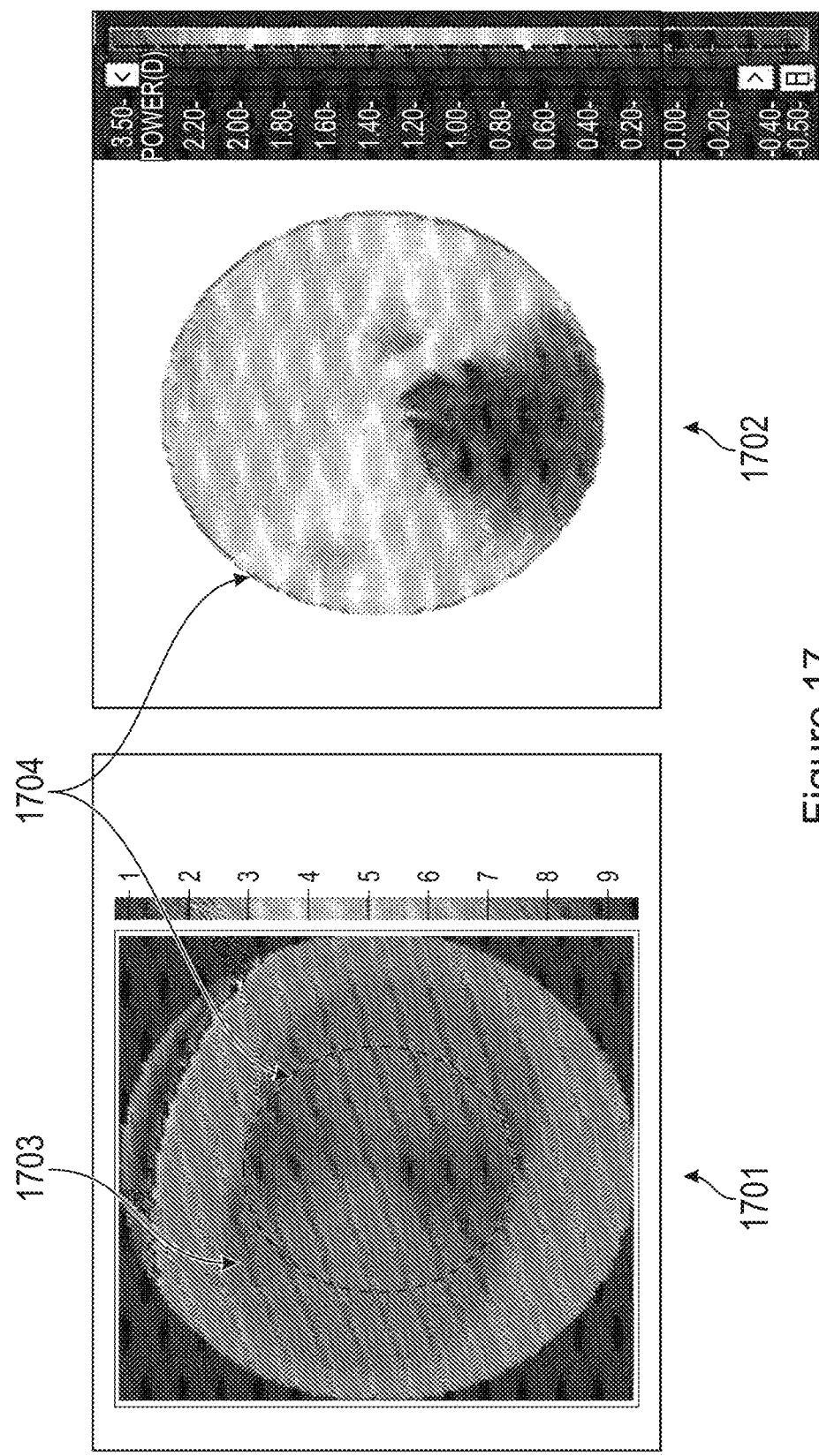
FIG. 17 illustrates the power distribution of the second region measured with a commercially available power mapping instrument (NIMOevo, Lambda-X, Belgium) using a 5 mm aperture and a 2.5 mm aperture, when the 2.5 mm aperture was aligned with the geometrical centre of the second region.

FIG. 17 illustrates two power maps obtained with the commercially available power mapping instrument NIMOevo (Lambda-X, Belgium) for a 5 mm aperture (1701) and a 2.5 mm aperture (1702) when the instrument was aligned with the geometrical centre of the second region of the prototype contact lens embodiment Lens #1. The power map obtained with the 5 mm aperture shows the expected elliptical shape of the second region (1703) within the optic zone.

Figure 18:
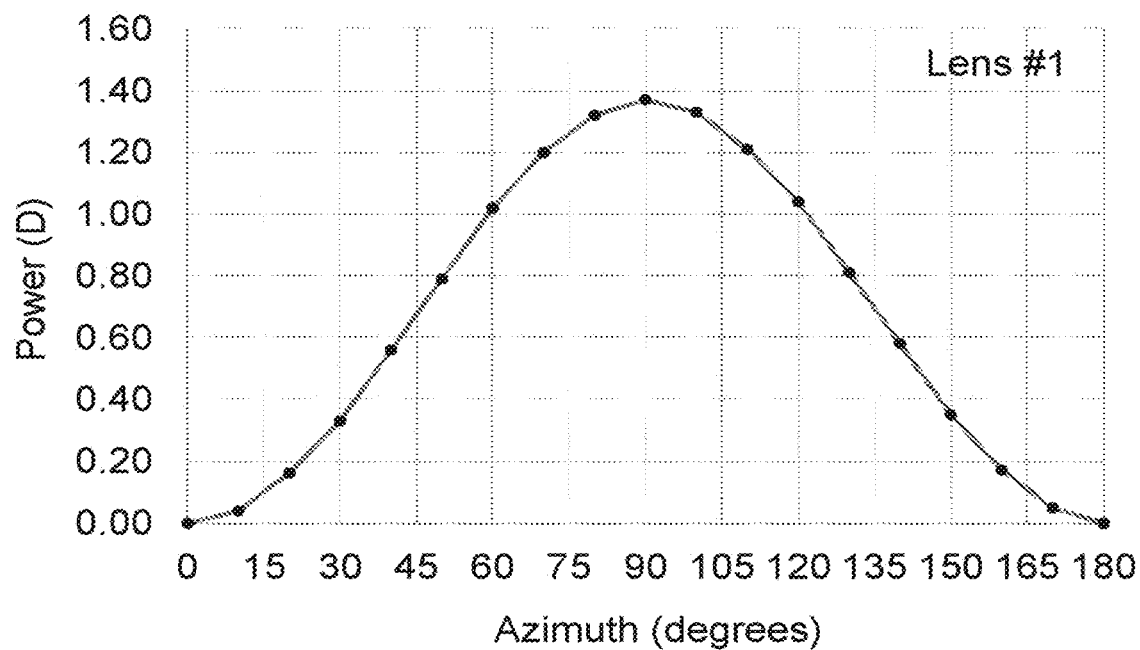
FIG. 18 illustrates the measured and cosine fitted relative power profile as a function azimuthal angle of the second region of the optic zone of one prototype contact lens (Lens #1) which is a variant of a contact lens embodiment described in FIG. 7.

When the diameter of the measurement zone (1704) was changed to 2.5 mm, which is the minor axis of the elliptical second region of Lens #1, the toric power profile of the second region is shown in 1702. The relative powers were then obtained in 10° steps from the power map (1702). FIG. 18 shows a measured and cosine-fitted cylinder power of about 1.4 DC for Lens #1, which is in line with the expected cylinder power for this lens.

Figure 19:
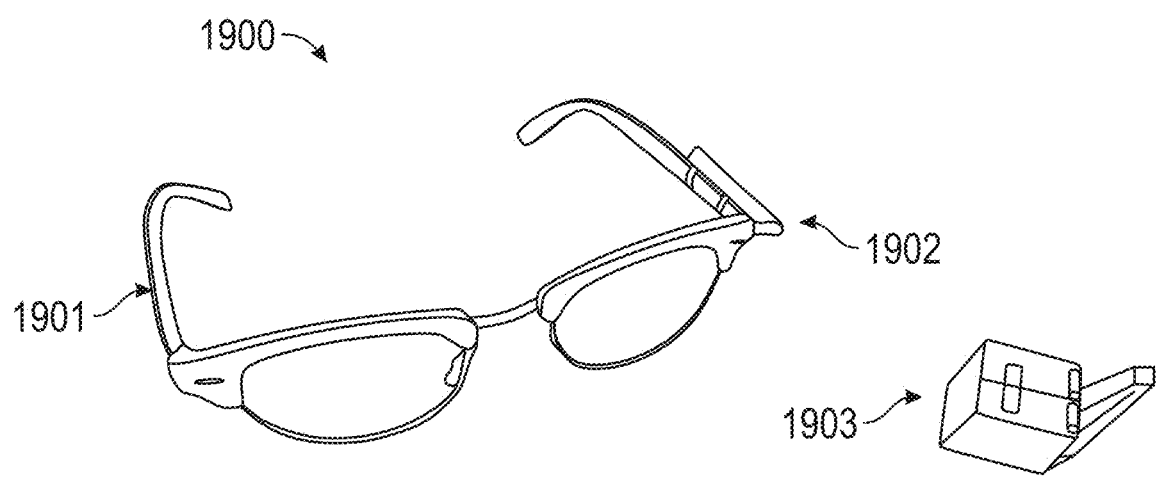
FIG. 19 shows a picture of a device used for the measurement of contact lens rotation over time.

FIG. 19 shows a picture of a device (1900) used for the measurement of contact lens rotation over time. The device (1900) consists of a small camera (1903, SQ11 Mini HD camera) attached to a simple spectacle frame (1901) using a mounting arm. The camera was positioned so that a video of the contact lens when worn on the eye could be taken over time, to assess the rotation of a contact lens embodiment disclosed herein, i.e. the spatially and temporally varying stimulus.

Figure 20:
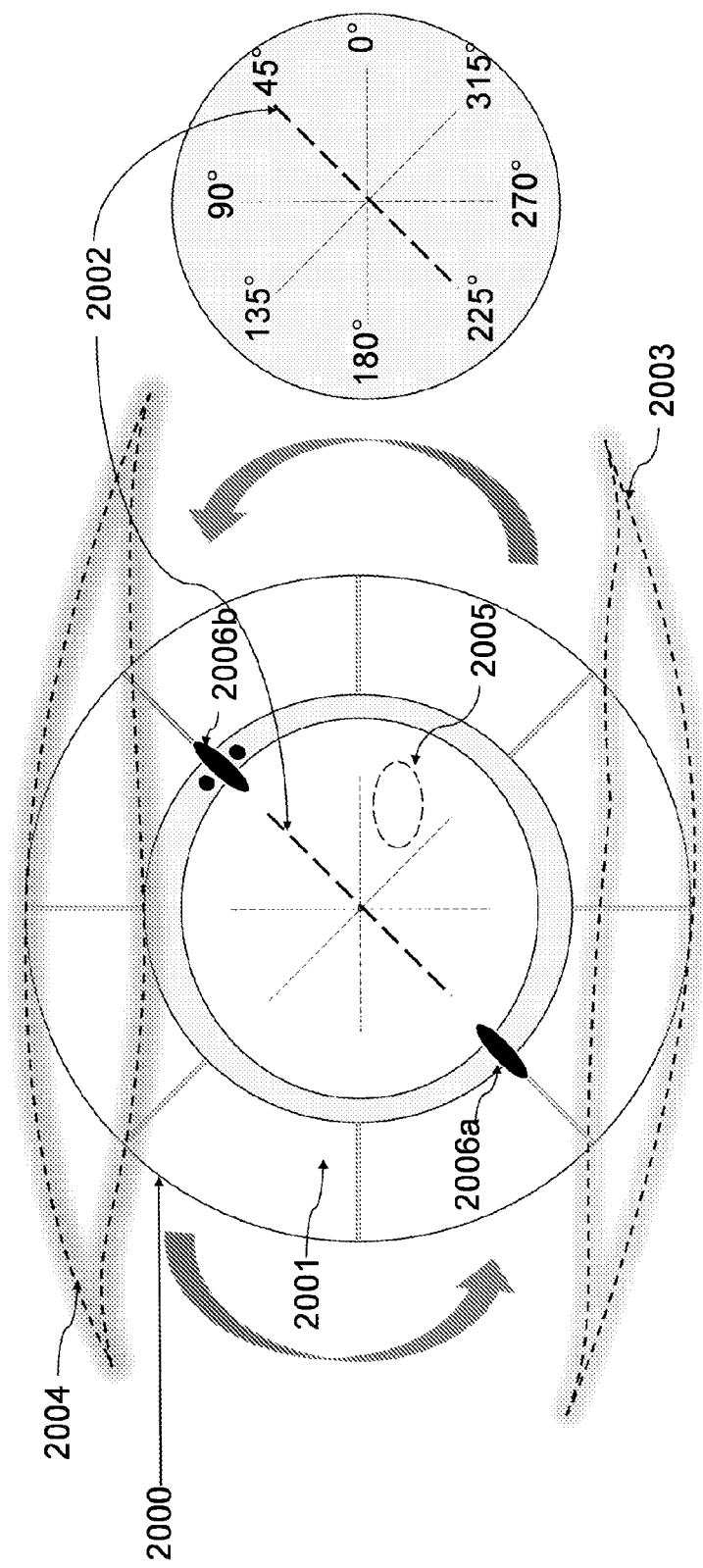
FIG. 20 shows the frontal view of a contact lens embodiment disclosed herein. The frontal view further illustrates a method of measuring the amount of rotation using the azimuthal location of the prototype contact lens (Lens #1) on the eye over time with help of two radial marks on the contact lens.

FIG. 20 shows the frontal view of a contact lens embodiment disclosed herein (2000). The frontal view further illustrates a method, i.e. two different markings along the same meridian on the contact lens embodiment (2006a and 2006b), which in conjunction with a device (1900) can be used to measure the azimuthal position of a specific contact lens meridian over time, i.e. the amount of rotation (2002). In this exemplary embodiment (2000), the contact lens marking (2006b) was located along the 45° meridian. In other embodiments, the markings may be of different shape, size or colour, and the number of markings may be more than 2 to provide additional ease in detecting the azimuthal position of a specific contact lens meridian over time.

Figure 21:
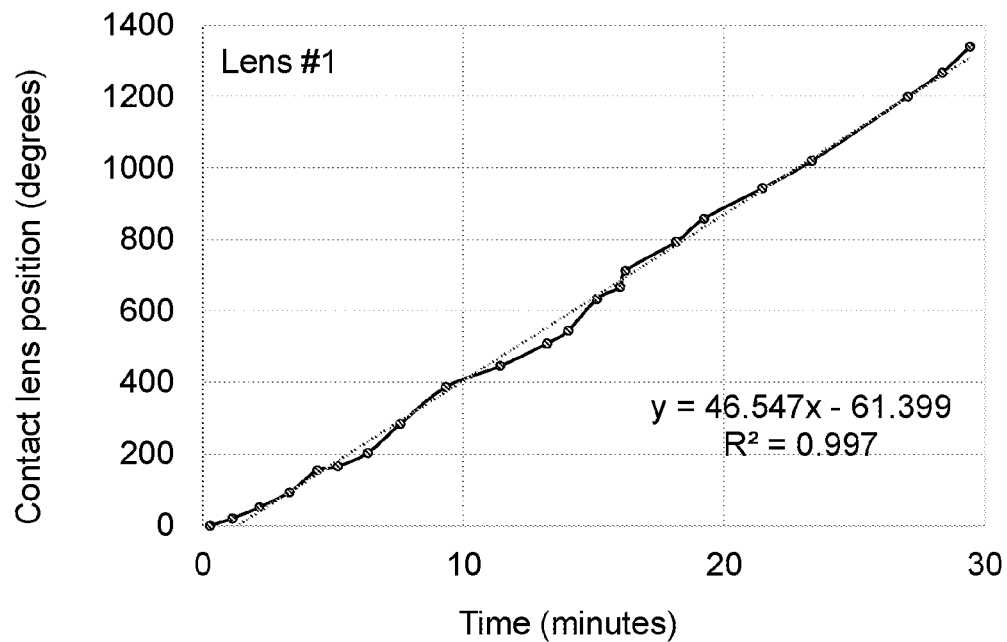
FIG. 21 shows the measured azimuthal position, of one prototype contact lens (Lens #1), over time, i.e. after about 30 minutes of lens wear.
Figure 22:
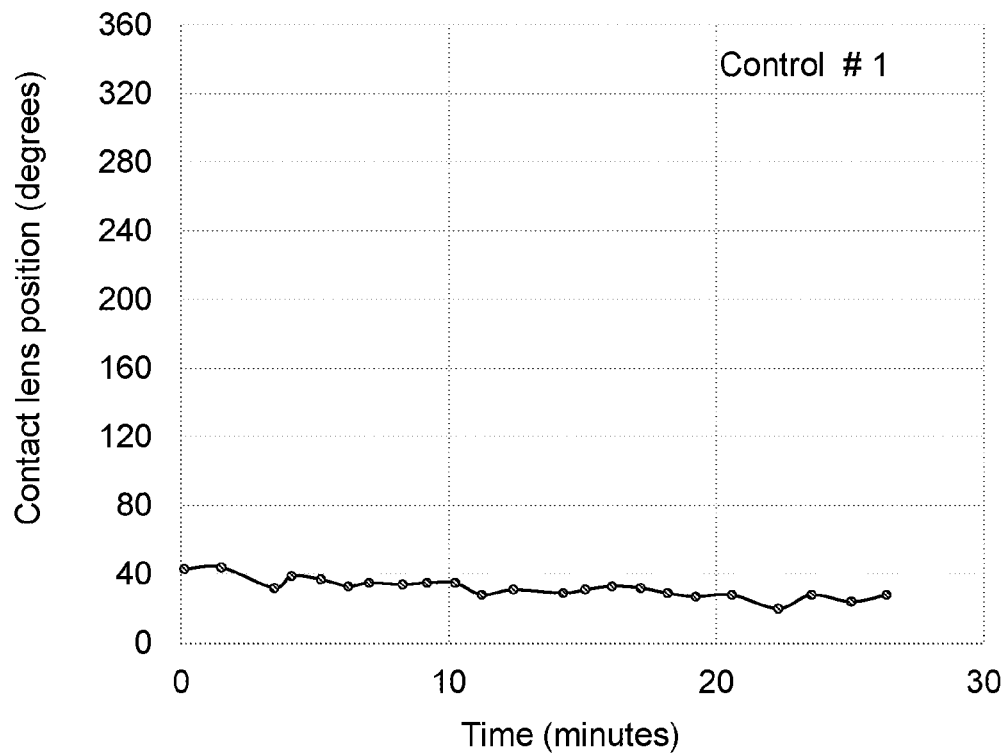
FIG. 22 shows the measured azimuthal position, of one commercially available toric contact lens (Control #1) over time, i.e. after about 30 minutes of lens wear.

In this example, the measured azimuthal position of the prototype contact Lens #1 and the commercially available toric contact lens Control #1 as a function of time are illustrated in FIGS. 21 and 22. In this example, the described contact lens monitoring device (1900) was worn by a consenting research participant wearing both the embodiment and control contact lenses in the described method. In this example, the lenses were worn for approximately about 30 minutes on two different occasions. As can be seen from FIGS. 21 and 22, unlike the commercially available stabilised toric contact lens Control #1, the prototype contact Lens #1 rotated almost four revolutions on eye within the 30 minutes of lens wear. In contrast to the embodiment of the present disclosure, the control lens demonstrated only a small amount of lens rotation over the 30 minutes of lens wear.

Few other exemplary embodiments are described in the following examples sets.

Example Set "A"—Astigmatic Profile within the Second Region

A contact lens for an eye, the contact lens including an optical zone around an optical centre and a non-optical peripheral carrier zone about the optical zone; wherein the optical zone is configured with a substantially single vision power distribution providing substantial correction for the eye, and a decentred second region with an astigmatic or toric power distribution located substantially away from the optical centre providing at least in part a regional conoid of Sturm on the retina of the eye; and wherein the non-optical peripheral carrier zone is configured with a thickness profile that is substantially rotationally symmetric about the optical centre.

The contact lens of one or more of the claims of the example set A, wherein the surface area of the second region within the optical zone configured with the substantially toric or astigmatic power distribution comprises at least 10% and no greater than 35% of the optical zone.

The contact lens of one or more of the claims of the example set A, wherein the at least regional conoid of Sturm on the retina is configured to provide a directional signal to substantially control eye growth of the eye The contact lens of one or more of the claims of the example set A, wherein the at least regional conoid of Sturm on the retina is configured substantially away from the macula.

The contact lens of one or more of the claims of the example set A, wherein the at least regional conoid of Sturm on the retina is configured substantially in front of the peripheral retina.

The contact lens of one or more of the claims of the example set A, wherein the at least regional conoid of Sturm on the retina is configured substantially behind the peripheral retina.

The contact lens of one or more of the claims of the example set A, wherein the substantially toric or astigmatic power distribution of the second region within the optical zone is configured on an anterior surface of the contact lens.

The contact lens of one or more of the claims of the example set A, wherein the substantially toric or astigmatic power distribution of the second region within the optical zone is configured on a posterior surface of the contact lens.

The contact lens of one or more of the claims of the example set A, wherein the substantially toric or astigmatic power distribution within the second region of the optical zone is configured in part by an anterior surface and in part by a posterior surface of the contact lens.

The contact lens of one or more of the claims of the example set A, wherein the thickest point within the non-optical peripheral carrier zone across any of the one half meridian is within a maximum variation of 30 μm of the thickest peripheral point of any other half meridian.

The contact lens of one or more of the claims of the example set A, wherein a thickness profile of the substantially rotationally symmetric region of the non-optical peripheral carrier zone in any meridian is within 6%, 7%, 8%, 9%, or 10% of an average thickness profile of the non-optical peripheral carrier zone measured about the optical centre of the contact lens.

The contact lens of one or more of the claims of the example set A, including a spherical blending zone between the optical zone and the non-optical peripheral carrier zone, wherein the width of the spherical blending zone spans at least 0.1 mm measured on a semi-chord diameter across the optical centre of the contact lens.

The contact lens of one or more of the claims of the example set A, wherein the substantially toric or astigmatic power distribution within the second region of the optic zone has an effective astigmatism or toricity of at least +1.25 dioptre cylindrical power.

The contact lens of one or more of the claims of the example set A, wherein the substantially toric or astigmatic power distribution within the second region of the optic zone has an effective astigmatism or toricity of at least +1.75 dioptre cylindrical power.

The contact lens of one or more of the claims of the example set A, wherein the substantially toric or astigmatic power distribution within the second region of the optic zone has an effective astigmatism or toricity of at least +2.25 dioptre cylindrical power.

The contact lens of one or more of the claims of the example set A, wherein the substantially toric or astigmatic power distribution is combined with the primary spherical aberration of at least +1 D defined over the minimum diameter of the second region.

The contact lens of one or more of the claims of the example set A, wherein the substantially toric or astigmatic power distribution is combined with the primary spherical aberration of at least −1 D defined over the minimum diameter of the second region.

The contact lens of one or more of the claims of the example set A, wherein the shape of the second region within the optical zone configured with substantially toric or astigmatic power distribution is substantially circular or elliptical.

The contact lens of one or more of the claims of the example set A, wherein the non-optical peripheral carrier zone provides a specific fit that provides a temporally and spatially varying optical stop signal for the wearer's eye.

The contact lens of one or more of the claims of the example set A, wherein the non-optical peripheral carrier zone is configured to allow at least one of: rotation of the contact lens by at least 15 degrees during an hour of wear on the myopic eye; and rotation of the contact lens by 180 degrees at least thrice during 8 hours of wear.

The contact lens of one or more of the claims of the example set A, wherein the non-optical peripheral carrier zone provides a specific fit that offers a temporally and spatially varying optical stop signal for the wearer's eye to provide a directional signal to substantially control eye growth of the eye that is substantially consistent over time.

The contact lens of one or more of the claims of the example set A, wherein the contact lens is configured for a myopic eye, without astigmatism, or with astigmatism of less than 1 dioptre cylinder power.

The contact lens of one or more of the claims of the example set A, wherein the contact lens is capable of providing the wearer with an adequate visual performance that is comparable to the performance obtained with a commercial single vision contact lens.

The contact lens of one or more of the claims of the example set A, wherein the contact lens is configured with an astigmatic or toric power profile substantially across the second region within the optic zone is described by standard conic sections, biconic, even or odd extended polynomials, or combinations thereof.

The contact lens of one or more of the claims of the example set A, wherein the contact lens is configured for the eye that is at risk of becoming myopic.

The contact lens of one or more of the claims of the example set A, wherein the second region within the optical zone is configured to provide, at least in part, adequate foveal correction to the eye, and further configured to provide, at least in part, a temporally and spatially varying stop signal to reduce the rate of eye growth.

The contact lens of one or more of the claims of the example set A, wherein the second region within the optical zone is configured to provide, at least in part, adequate foveal correction to the eye, and further configured to provide, at least in part, a temporally and spatially varying stop signal to reduce the rate of eye growth that is substantially consistent over time.

The contact lens of one or more examples of set A, wherein the contact lens is capable of modifying the incoming light and utilises the cues offered by the induced astigmatism incorporated at least in part by the second region within the optical zone to decelerate the rate of myopia progression.

The contact lens of one or more examples of set A, wherein the contact lens offers a temporally and spatially variant stop signal to the wearers by the virtue of on-eye contact lens rotation facilitated at least in part by the rotationally symmetric non-optical peripheral carrier zone.

The contact lens of one or more examples of set A, the at least in part regional conoid of Sturm formed on the retina is outside the sub-foveal region but within the macular region of the retina.

The contact lens of one or more examples of set A, the at least in part regional conoid of Sturm formed on the retina is outside the foveal region but within the para-macular region of the retina.

A method comprising: applying to a myopic eye or prescribing for a myopic eye a contact lens, the contact lens comprising a configuration effective to, for the myopic eye: provide a spherical correction to at least reduce the myopic error of the myopic eye; and introduce astigmatic error to the myopic eye; and rotate on the eye during wear of the contact lens, whereby the astigmatic error is temporally and spatially variable.

The method of the above claim example of set A, wherein the contact lens is a contact lens as claimed in any one or more of the above claims of the example set A.

Example Set "B"—Asymmetric Power Profile within the Second Region

A contact lens for an eye, the contact lens including an optical zone around an optical centre and a non-optical peripheral carrier zone about the optical zone, wherein the optical zone is configured with substantially single vision power distribution providing substantial correction for the eye, and a second region with an asymmetric power distribution located substantially away from the optical centre providing at least in part a regional conoid of Sturm on the retina of the eye, and wherein the non-optical peripheral carrier zone is configured substantially without a ballast, or otherwise configured to allow rotation of the lens when on the eye, to provide a substantial temporal and spatial variation to the optical stop signal.

The contact lens of one or more of the claims of the example set B, wherein the surface area of the second region within the optical zone configured with the substantially asymmetric power distribution comprises at least 10% and no greater 35% of the optical zone.

The contact lens of one or more of the claims of the example set B, wherein the at least regional conoid of Sturm on the retina is configured to provide a directional signal to substantially control eye growth of the eye The contact lens of one or more of the claims of the example set B, wherein the at least regional conoid of Sturm on the retina is configured substantially away from the macula.

The contact lens of one or more of the claims of the example set B, wherein the at least regional conoid of Sturm on the retina is configured substantially before the peripheral retina.

The contact lens of one or more of the claims of the example set B, wherein the at least regional conoid of Sturm on the retina is configured substantially about the peripheral retina.

The contact lens of one or more of the claims of the example set B, wherein the at least regional conoid of Sturm on the retina is configured substantially in front of the peripheral retina.

The contact lens of one or more of the claims of the example set B, wherein the substantially toric or astigmatic power distribution of the second region within the optical zone is configured on an anterior surface of the contact lens.

The contact lens of one or more of the claims of the example set B, wherein the substantially toric or astigmatic power distribution of the second region within the optical zone is configured on a posterior surface of the contact lens.

The contact lens of one or more of the claims of the example set B, wherein the substantially toric or astigmatic power distribution within the second region of the optical zone is configured in part by an anterior surface and in part by a posterior surface of the contact lens.

The contact lens of one or more of the claims of the example set B, wherein the thickest point within the non-optical peripheral carrier zone across any of the one meridian is within a maximum variation of 30 µm of the thickest peripheral point of any other meridian.

The contact lens of one or more of the claims of the example set B, wherein a thickness profile of the substantially rotationally symmetric region of the non-optical peripheral carrier zone in any meridian is within 5%, 6%, 7%, 8%, 9% or 10% of an average thickness profile of the non-optical peripheral carrier zone measured about the optical centre of the contact lens.

The contact lens of one or more of the claims of the example set B, including a spherical blending zone between the optical zone and the non-optical peripheral carrier zone, wherein the width of the spherical blending zone spans at least 0.1 mm measured on a semi-chord diameter across the optical centre of the contact lens.

The contact lens of one or more of the claims of the example set B, wherein the substantially toric or astigmatic power distribution within the second region of the optic zone has an effective astigmatism or toricity of at least +1.25 dioptre cylindrical power.

The contact lens of one or more of the claims of the example set B, wherein the non-optical peripheral carrier zone provides a specific fit that provides a temporally and spatially varying optical stop signal for the wearers eye to provide a directional signal to substantially control eye growth of the eye.

The contact lens of one or more of the claims of the example set B, wherein the substantially asymmetric power distribution within the second region is expressed using a power distribution function described by the expression $C_a * \cos(m\theta)$, wherein $C_a$ is an azimuthal coefficient, m is an integer between 1 and 6, and Theta (A) is the azimuthal angle of a given point of the optic zone.

The contact lens of one or more of the claims of the example set B, wherein the substantially asymmetric power distribution within the second region is expressed using a power distribution function described by the expression (Radial component)*(Azimuthal component), the Radial component of the power distribution function is described as $C_r * \rho$, wherein $C_r$ is the coefficient of the expansion and Rho ($\rho$) is the normalised radial co-ordinate ($\rho_0/\rho_{max}$); the Azimuthal component of the power distribution function is described as $C_a * \cos(m\theta)$, wherein m can be any integer between 1 and 6, and Theta ($\theta$) is the azimuthal angle, wherein Rho ($\rho_0$) is the radial coordinate at a given point, wherein $\rho_{max}$ is the maximum radial co-ordinate or semi-diameter of the optic zone.

The contact lens of one or more of the claims of the example set B, wherein the substantially asymmetric power distribution is expressed using a power distribution function that is described at least in part using at least one or more of the terms of the Bessel circular functions of the first kind with a generic expression of (n, m); wherein the at least one or more of the terms of the Bessel Circular function are obtained when n takes values of 1, 2, 3 and m takes values of ±2.

The contact lens of one or more of the claims of the example set B, wherein the azimuthal power distribution function within the second region of the optical zone is in a form of $\cos^2(m\theta)$, wherein m is an integer between 1 and 6 inclusive.

The contact lens of one or more of the claims of the example set B, wherein the shape of the second region within the optical zone configured with substantially asymmetric power distribution is substantially circular or elliptical in shape.

The contact lens of one or more of the claims of the example set B, wherein the non-optical peripheral carrier zone is configured to allow at least one of: rotation of the contact lens by at least 15 degrees during an hour of wear on the myopic eye; and rotation of the contact lens by 180 degrees at least thrice during 8 hours of wear.

The contact lens of one or more of the claims of the example set B, wherein the non-optical peripheral carrier zone provides a specific fit offers a temporally and spatially varying optical stop signal for the wearer's eye to provide a directional signal to substantially control eye growth of the eye that is substantially consistent over time.

The contact lens of one or more of the claims of the example set B, wherein the contact lens is configured for a myopic eye, without astigmatism, or with astigmatism less than 1 dioptre cylinder power.

The contact lens of one or more of the claims of the example set B, wherein the contact lens is capable of providing the wearer with an adequate visual performance that is comparable to the performance obtained with a commercial single vision contact lens.

The contact lens of one or more of the claims of the example set B, wherein the contact lens is configured with an asymmetric power profile substantially across the second region within the optic zone is described by Bessel functions, Jacobi polynomials, Taylor polynomials, Fourier expansion, or combinations thereof.

The contact lens of one or more of the claims of the example set B, wherein the contact lens is configured for the eye that is at risk of becoming myopic.

The contact lens of one or more of the claims of the example set B, wherein the second region within the optical zone is configured to provide, at least in part, adequate foveal correction to the eye, and further configured to provide, at least in part, a temporally and spatially varying stop signal to reduce the rate of eye growth.

The contact lens of one or more of the claims of the example set B, wherein the optical zone is configured to provide, at least in part, adequate foveal correction to the eye, and further configured to provide, at least in part, a temporally and spatially varying stop signal to reduce the rate of eye growth that is substantially consistent over time.

A contact lens of one or more examples of set B, wherein the contact lens is capable of modifying the incoming light and utilises the cues offered by the induced asymmetric optical signal incorporated at least in part by the second region within the optical zone to decelerate the rate of myopia progression.

A contact lens of one or more examples of set B, wherein the contact lens offers a temporally and spatially variant stop signal to the wearers by the virtue of on-eye contact lens rotation facilitated at least in part by the rotationally symmetric non-optical peripheral carrier zone.

The contact lens of one or more examples of set B, the at least in part regional conoid of Sturm formed on the retina is outside the sub-foveal region but within the macular region of the retina.

The contact lens of one or more examples of set B, the at least in part regional conoid of Sturm formed on the retina is outside the foveal region but within the para-macular region of the retina.

A method comprising: applying to a myopic eye or prescribing for a myopic eye a contact lens, the contact lens comprising a configuration effective to, for the myopic eye: provide a spherical correction to at least reduce the myopic error of the eye; and introduce stop signal to the myopic eye; and rotate on the eye during wear of the contact lens, whereby the stop signal is temporally and spatially variable.

The method of the above claim example of set B, wherein the contact lens is a contact lens as claimed in any one or more of the above claims of the example set B In some examples, the said regional conoid of Sturm may be configured in the para-macular region of the retina; while in other examples regional conoid of Sturm may be configured in a peripheral field on the retina.

The invention claimed is:

1. A contact lens for an eye, the contact lens including an optical zone around an optical centre and covering a surface area, a first region within the optical zone covering a substantial portion of the surface area of the optical zone, a decentred second region within the optical zone and defined about a geometric centre that is decentred relative to the optical centre, wherein the decentred second region covers a different portion of the surface area of the optical zone to the first region and has a surface area of at least 5% of the surface area of the optical zone, and a non-optical peripheral carrier zone about the optical zone; wherein at least the first region is configured with a base prescription providing refractive correction for the eye, and the decentred second region is configured with an astigmatic, or toric, power distribution providing at least in part a regional conoid of Sturm on the retina of the eye; and wherein the non-optical peripheral carrier zone is configured with a thickness profile that is substantially rotationally symmetric about the optical centre to facilitate substantially free rotation of the contact lens over time when on the eye, wherein in one rotational position of the contact lens on the eye, the contact lens provides a first region of the retina of the eye with the refractive correction and not the regional conoid of Sturm, and in another rotational position the contact lens provides the first region of the retina with the regional conoid of Sturm.

2. The contact lens of claim 1, wherein the surface area of the decentred second region no greater than 40% of the surface area of the optical zone.

3. The contact lens of claim 1, wherein the geometric centre of the decentred second region is at least 0.75 mm away from the optical centre.

4. The contact lens of claim 1, wherein the substantially toric or astigmatic power distribution within the decentred second region has a magnitude of at least +1.25 DC.

5. The contact lens of claim 1, wherein the substantially toric or astigmatic power distribution is combined with a primary spherical aberration of at least +1 D defined over a minimum diameter of the second region.

6. The contact lens of claim 1, wherein the substantially toric or astigmatic power distribution is combined with a primary spherical aberration of at least −1 D defined over a minimum diameter of the second region.

7. The contact lens of claim 1, wherein the decentred second region has a substantially circular or elliptical shape.

8. The contact lens of claim 1, wherein the regional conoid of Sturm at the retina of the eye is formed substantially in front of the retina.

9. The contact lens of claim 1, wherein a thickest point within the non-optical peripheral carrier zone across any one half meridian is within a maximum variation of 30 μm of a thickest peripheral point of any other half meridian.

10. The contact lens of claim 1, wherein a thickness profile of the substantially rotationally symmetric region of the non-optical peripheral carrier zone in any meridian is within 7% of an average thickness profile of the non-optical peripheral carrier zone measured about the optical centre of the contact lens.

11. The contact lens of claim 1, wherein the non-optical peripheral carrier zone is configured to allow at least one of: rotation of the contact lens by at least 15 degrees during an hour of wear on the myopic eye; and rotation of the contact lens by 180 degrees at least thrice during 8 hours of wear.

12. The contact lens of claim 1, wherein the contact lens is configured for a myopic eye, without astigmatism, or with astigmatism less than 1 dioptre cylinder power.

13. The contact lens of claim 1, wherein the regional conoid of Sturm formed on the retina is outside the subfoveal region but within the macular region of the retina.

14. The contact lens of claim 1, wherein the astigmatic or toric power distribution of the decentred second region comprises two principal meridians; wherein the power of at least one principal meridian is different to the power of the remainder of the optical zone.

15. The contact lens of claim 1, wherein the astigmatic or toric power distribution of the decentred second region comprises two principal meridians; wherein the power of both principal meridians is different to the power of the remainder of the optical zone.

16. The contact lens of claim 1, wherein the regional conoid of Sturm is formed in part behind the retina.

17. The contact lens of claim 1, wherein the substantially free rotation of the contact lens over time provides a temporally and spatially varying optical stop signal for the wearer's eye to provide a directional cue optical signal to substantially control eye growth of the eye.

18. The contact lens of claim 1, wherein the first and second regions of the contact lens are diametrically opposed.

19. The contact lens of claim 1, wherein the first region of the contact lens covers the entirety of the optical zone outside of the second region of the contact lens.

20. The contact lens of claim 1, wherein the surface area of the decentred second region is at least 10% and no greater than 35% of the surface area of the optical zone.

* * * * *